(12) United States Patent
Launay et al.

(10) Patent No.: US 7,962,311 B2
(45) Date of Patent: Jun. 14, 2011

(54) METHOD USING CAPACITIVE SENSORS FOR MORPHOLOGY DISCRIMINATION OF A PASSENGER SEATING IN AN AUTOMOTIVE SEAT

(75) Inventors: Claude Launay, Champigny (FR); Tomoaki Hirai, Kanagawa-ken (JP); Joaquim Da Silva, Sennely (FR); Florent Voisin, Guillerval (FR); Takanori Ninomiya, Kanagawa-ken (JP); Shunji Maeda, Kanagawa-Ken (JP)

(73) Assignee: Hitachi Computer Products (Europe) S.A.S., Olivet (FR)

( * ) Notice: Subject to any disclaimer, the term of this patent is extended or adjusted under 35 U.S.C. 154(b) by 554 days.

(21) Appl. No.: 11/820,963

(22) Filed: Jun. 21, 2007

(65) Prior Publication Data
US 2008/0021650 A1    Jan. 24, 2008

(30) Foreign Application Priority Data

Jun. 23, 2006  (EP) .................................... 06291030

(51) Int. Cl.
*G01C 22/02*    (2006.01)

(52) U.S. Cl. ..................................................... 702/158
(58) Field of Classification Search ................ 702/1, 33, 702/41, 52, 54, 56, 129, 158, 173, 189, 193; 701/45, 49; 340/541, 561
See application file for complete search history.

(56) References Cited

U.S. PATENT DOCUMENTS

2006/0187038 A1 * 8/2006 Shieh et al. .................... 340/562
2006/0208169 A1 * 9/2006 Breed et al. .................... 250/221

* cited by examiner

*Primary Examiner* — Mohamed Charioui
(74) *Attorney, Agent, or Firm* — Blakely, Sokoloff, Taylor & Zafman

(57) ABSTRACT

The present invention relates to a method for discriminating the morphology of a passenger seating in an automotive seat, comprising the steps of i) providing a set of a plurality of capacitive sensors (100) covering substantially a transversal cross section of a seat, ii) collecting the outputs of said plurality of capacitive sensors (100) provided on the seat, iii) determining the morphology of a target (10) facing the seat on the basis of measured distance separating the target (10) from the sensors (100) and measured surface of the sensors (100) covered by the target (10), from said outputs, and iv) comparing the determined morphology with at least a reference so as to classify the determined morphology between a plurality of reference ones.

25 Claims, 21 Drawing Sheets

FIG_3
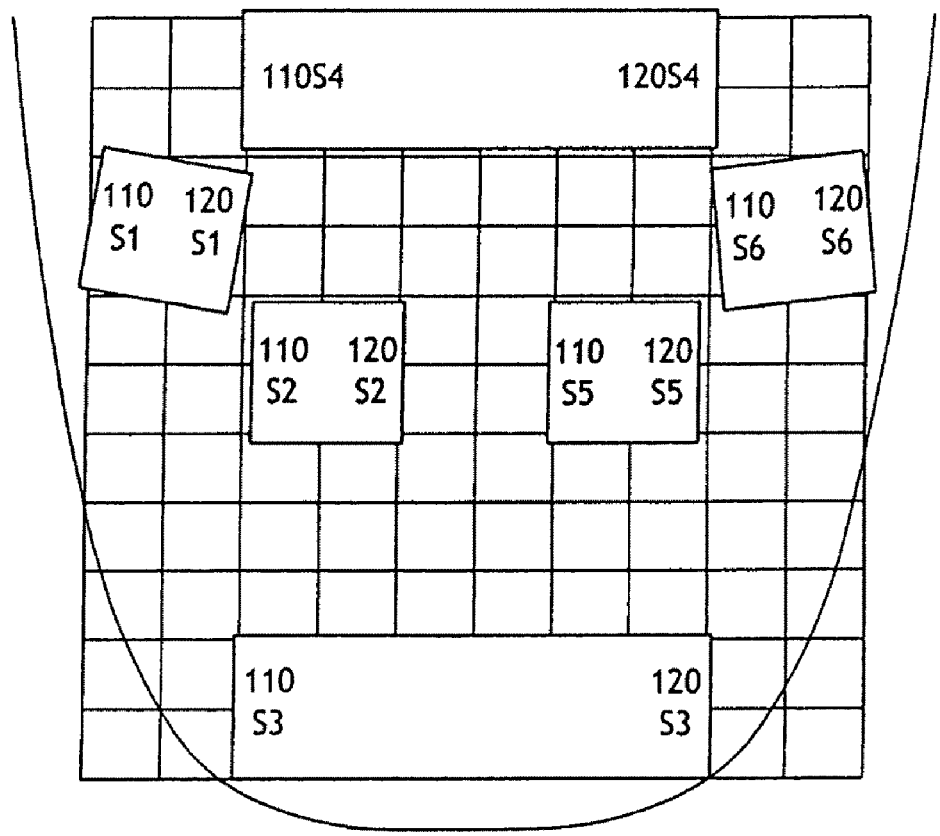
FIG_4
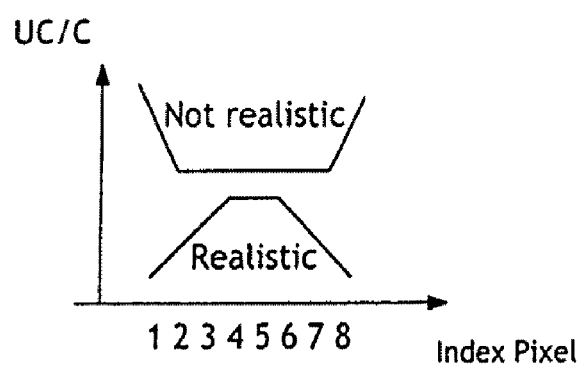

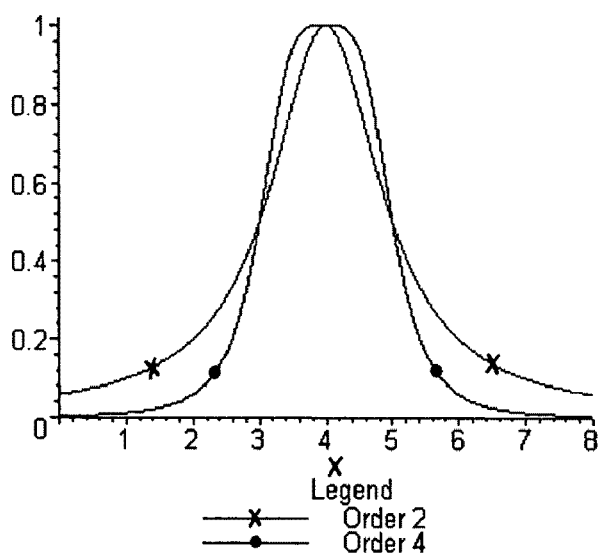
FIG_5
$$S(p) = \frac{ba}{a+(p-m)^2}$$
Bell like function with:
b maximal value,
m is the value for which S(p) is maximal.
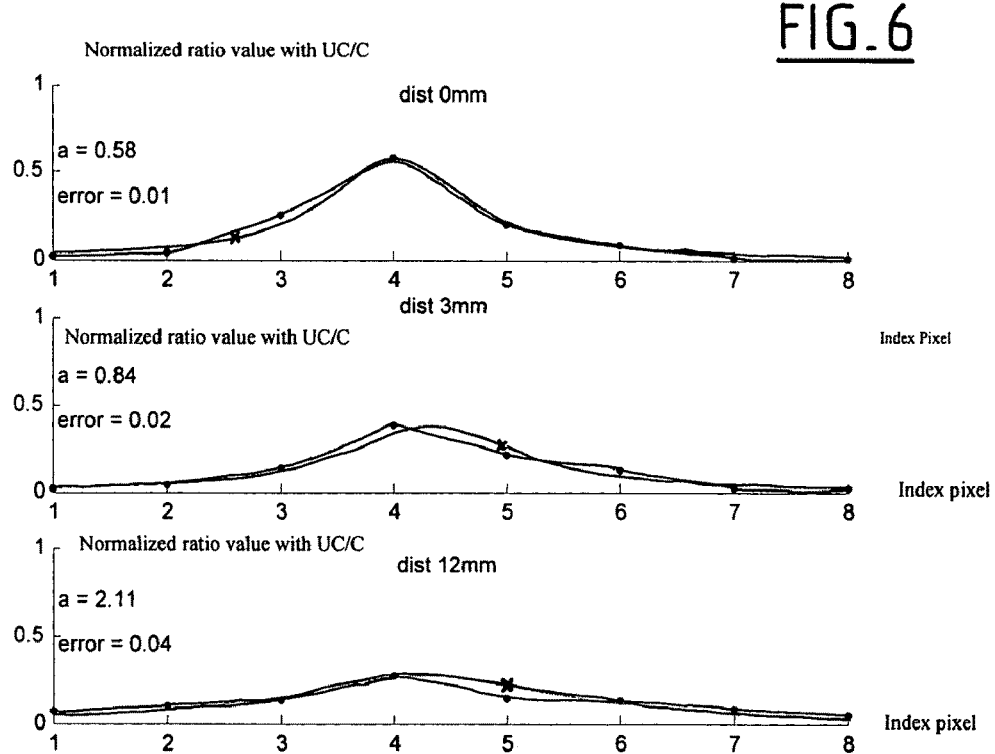
FIG_6

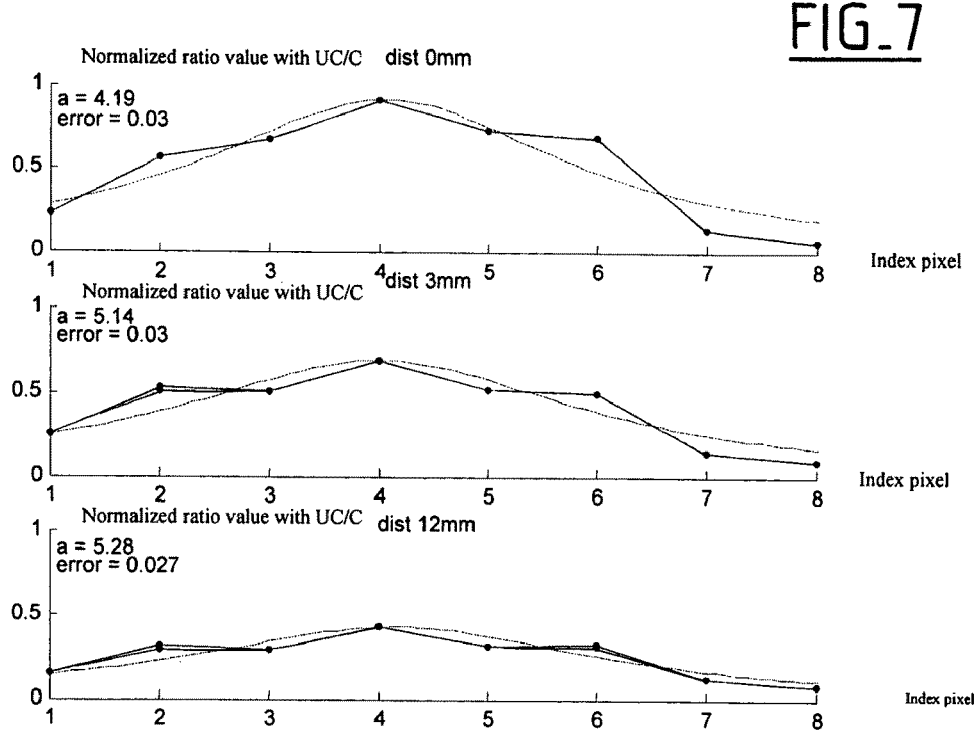
FIG_7
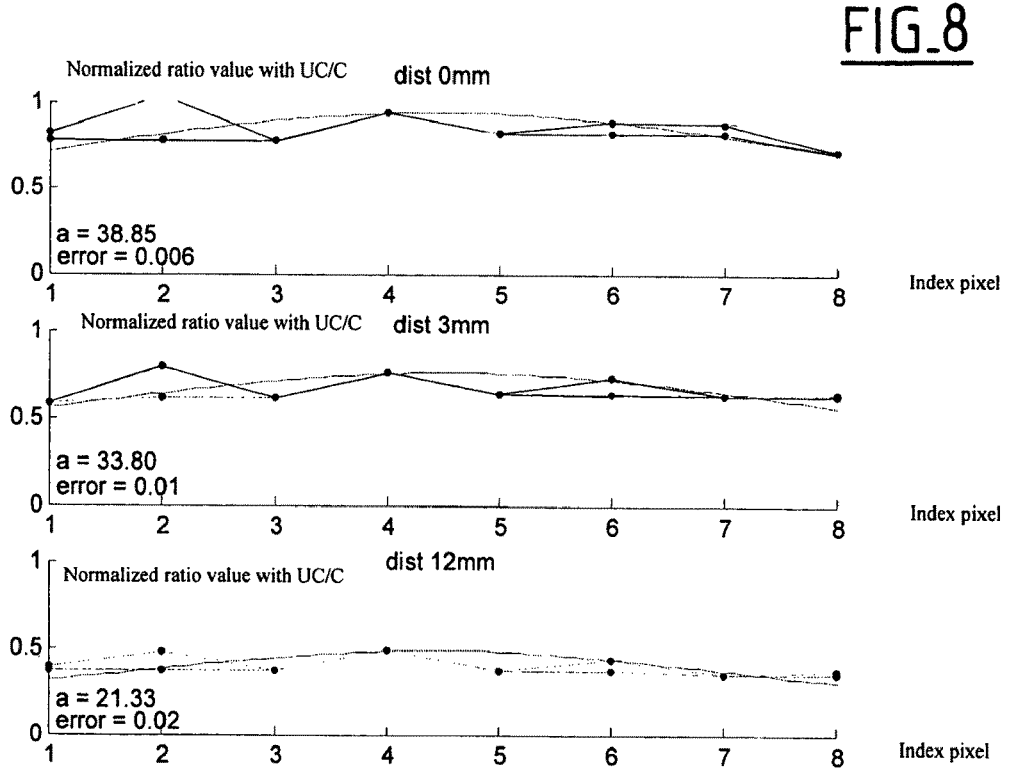
FIG_8

FIG_9
| Passenger | Distance (mm) | a | Error |
|---|---|---|---|
| Children | 0 | 0.58 | 0.01 |
| Children | 3 | 0.84 | 0.02 |
| Children | 12 | 2.11 | 0.04 |
| Adult | 0 | 4.19 | 0.03 |
| Adult | 3 | 5.14 | 0.03 |
| Adult | 12 | 5.28 | 0.03 |
| Big Adult | 0 | 38.85 | 0.006 |
| Big Adult | 3 | 33.80 | 0.01 |
| Big Adult | 12 | 21.33 | 0.02 |
FIG_10
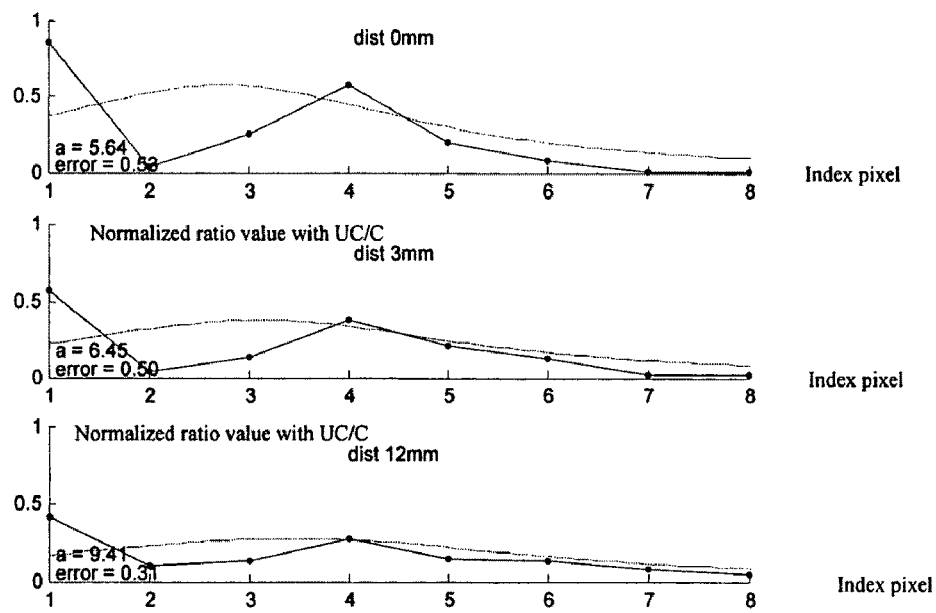

FIG_13
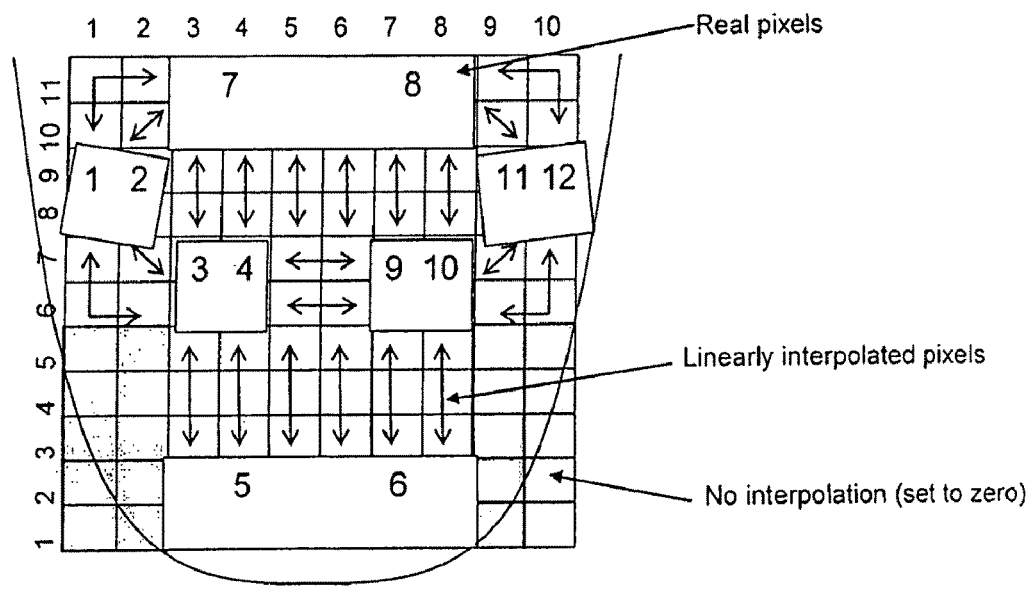
FIG_14
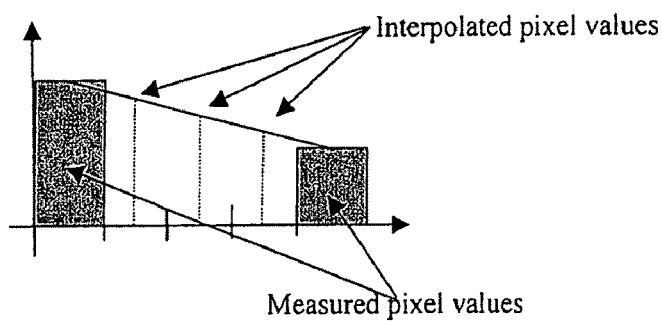

FIG_18
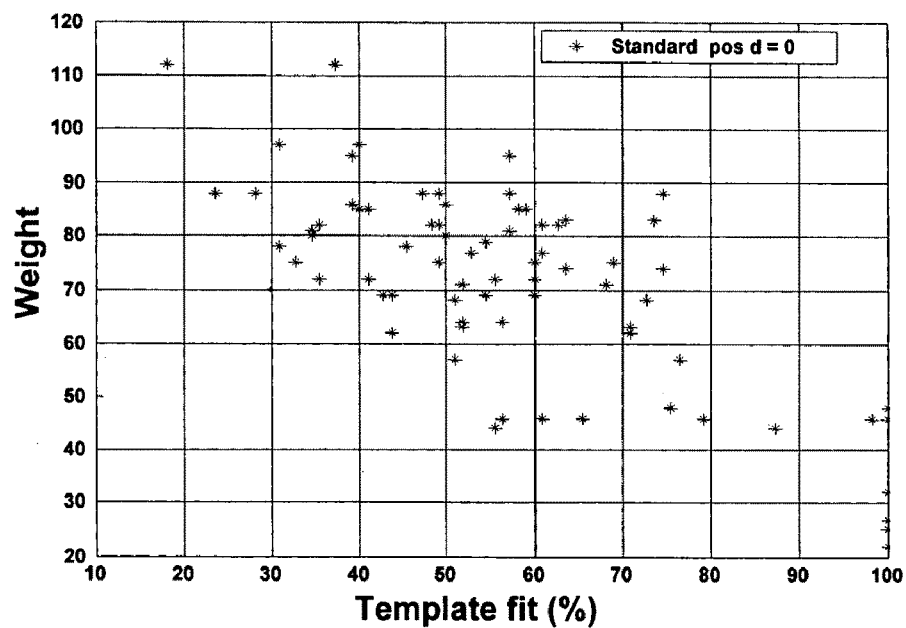
FIG_19
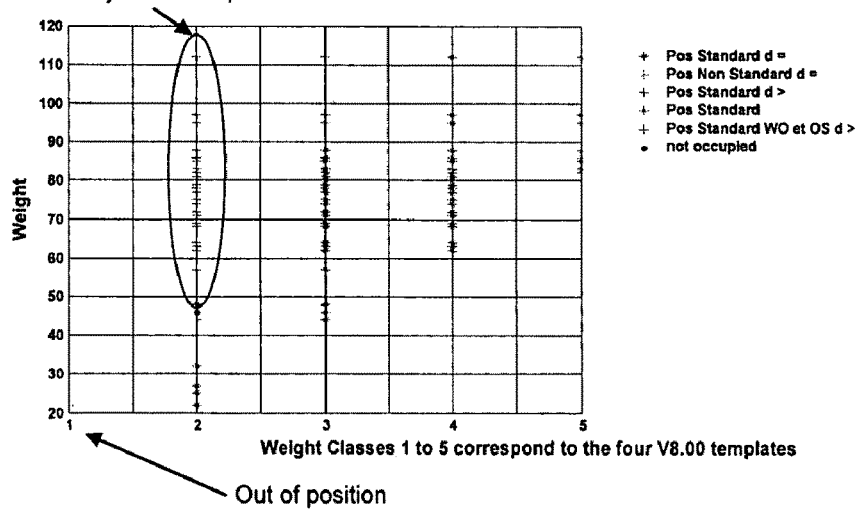

FIG_20
|     | 110 | 120 | 130 |
|-----|-----|-----|-----|
| C1  | Vf  | Vf  | G   |
| CU1 | Vf  | Vf  | Vf  |
| C2  | Vf  | Vf  | G   |
| CU2 | Vf  | Vf  | Vf  |
FIG_21
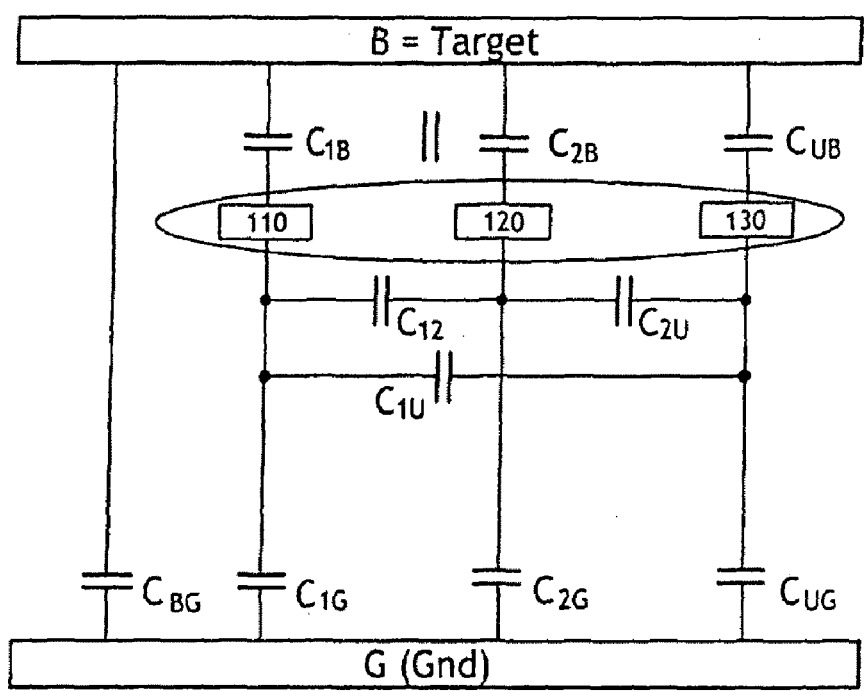

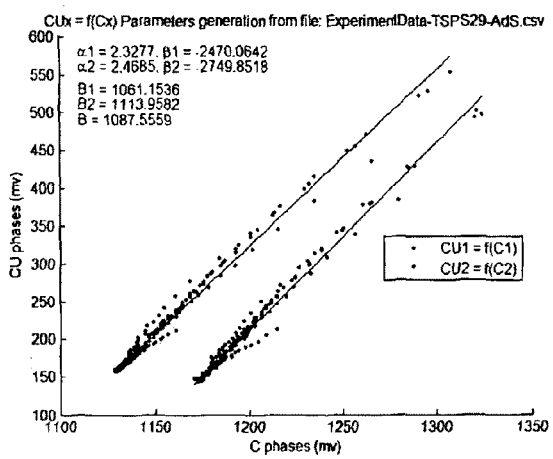
FIG.25a
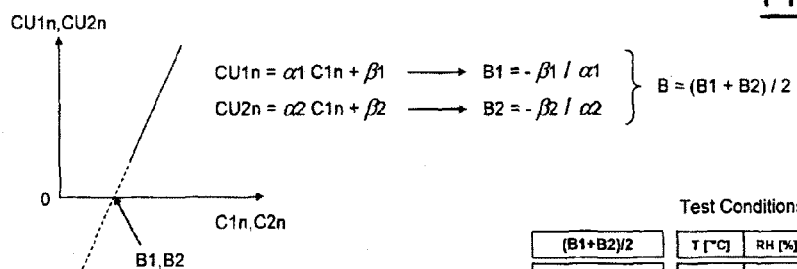
FIG.25b
Result:
$\overline{\alpha 1} = 2.37$ (min. 2.14 - max. 2.61)
$\overline{\alpha 2} = 2.48$ (min. 2.24 - max. 3.08)
Test Conditions
| (B1+B2)/2 | T [°C] | RH [%] |
|---|---|---|
| 1115 | 25 | 50 |
| 1123 | 25 | 70 |
| 1162 | 25 | 95 |
| 1143 | 40 | 50 |
| 1163 | 40 | 70 |
| 1288 | 40 | 95 |
| 1150 | 55 | 50 |
| 1166 | 55 | 70 |
| 1386 | 55 | 95 |
| 1173 | 70 | 50 |
| 1239 | 70 | 70 |
| 1537 | 70 | 95 |
FIG.25c

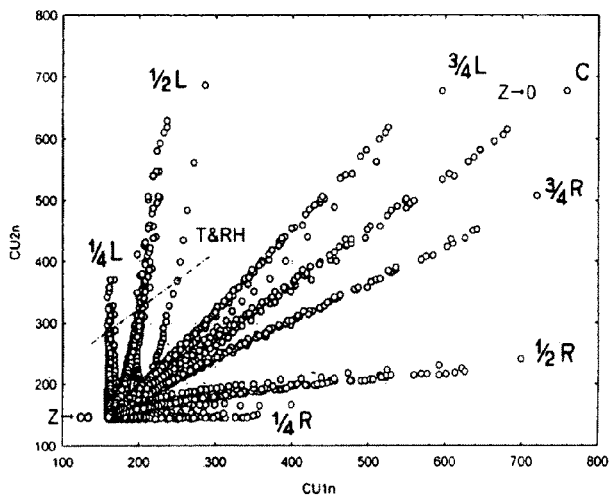
FIG. 26a
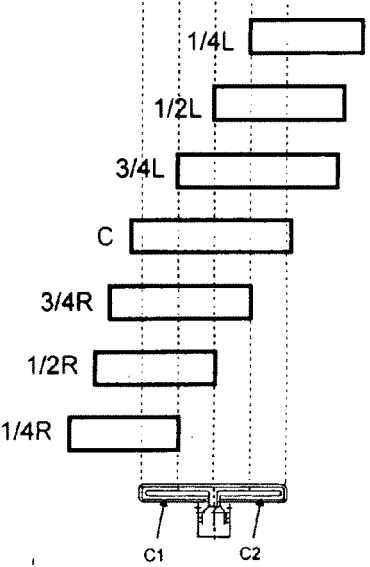
FIG. 26b
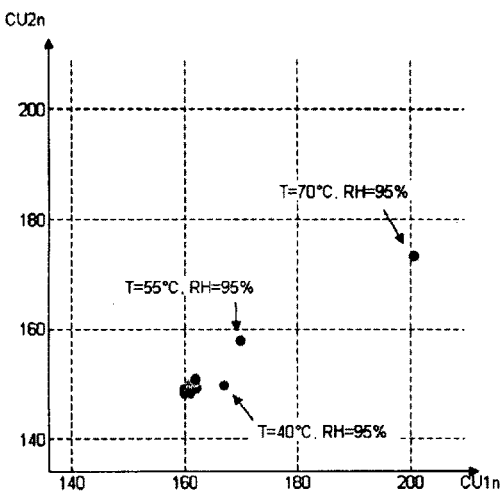
FIG. 27a
FIG. 27b
| | Temp | Hygro | $\frac{B1+B2}{2}$ | CU1n | | | | CU2n | | | |
|---|---|---|---|---|---|---|---|---|---|---|---|
| | | | | Ave | Max | Min | delta [%] | Ave | Max | Min | delta [%] |
| ● | 25 | 50 | 1115 | 160 | 163 | 157 | 3.7 | 149 | 150 | 146 | 2.7 |
| ● | 25 | 70 | 1123 | 161 | 162 | 158 | 2.5 | 149 | 151 | 146 | 3.4 |
| ● | 25 | 95 | 1162 | 162 | 164 | 160 | 2.5 | 149 | 152 | 146 | 4.0 |
| ● | 40 | 50 | 1142 | 160 | 161 | 157 | 2.5 | 148 | 150 | 144 | 4.1 |
| ● | 40 | 70 | 1163 | 161 | 162 | 159 | 1.9 | 148 | 150 | 144 | 4.1 |
| ● | 40 | 95 | 1288 | 167 | 169 | 165 | 2.4 | 149 | 151 | 145 | 4.0 |
| ● | 55 | 50 | 1150 | 161 | 163 | 159 | 2.5 | 150 | 151 | 147 | 2.7 |
| ● | 55 | 70 | 1166 | 162 | 163 | 158 | 3.1 | 149 | 151 | 146 | 3.4 |
| ● | 55 | 95 | 1386 | 170 | 173 | 168 | 2.9 | 158 | 160 | 154 | 3.8 |
| ● | 70 | 50 | 1204 | 162 | 165 | 160 | 3.1 | 150 | 152 | 147 | 3.3 |
| ● | 70 | 70 | 1239 | 162 | 165 | 160 | 3.1 | 151 | 153 | 148 | 3.3 |
| ● | 70 | 95 | 1537 | 201 | 204 | 198 | 3.0 | 173 | 176 | 168 | 4.6 |

$$\sqrt{(CU1-OCU1(TRH))^2+(CU2-OCU2(TRH))^2}$$

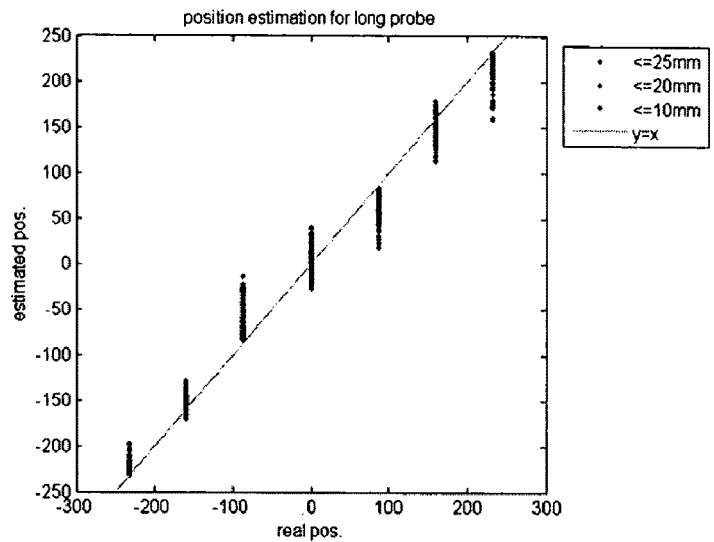
FIG_30
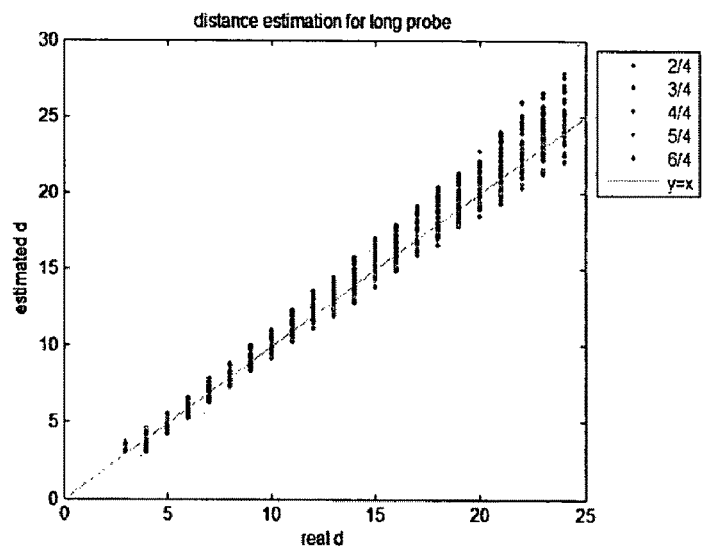
FIG_31

This transition must be forbidden

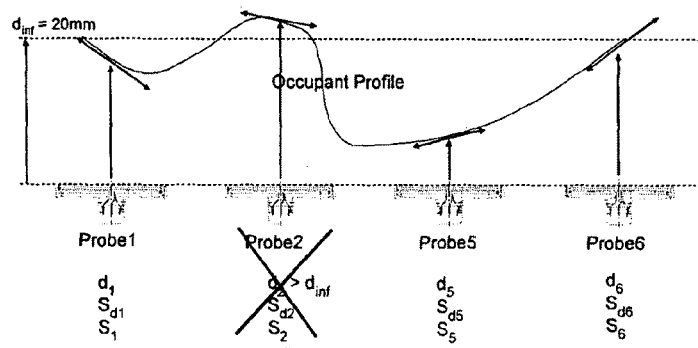

FIG.38

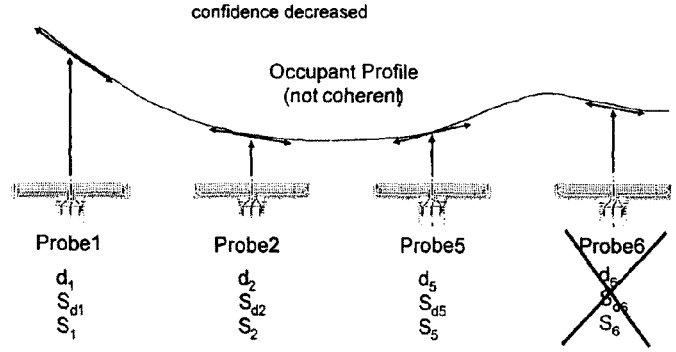

| SENSOR S1 AND S2 (LEFT SIDE) | | | | |
|---|---|---|---|---|
| SENSOR OUTPUT | | TREATMENT | | REM |
| S1 | S2 | S1 | S2 | |
| E | E | - | - | |
| | L | - | * | |
| | C | - | Σ | |
| | R | - | Σ | |
| L | E | * | - | Hole detection |
| | L | * | * | |
| | C | * | Σ | |
| | R | * | Σ | |
| C | E | * | - | Hole detection |
| | L | ▲ | ▲ | |
| | C | Σ | Σ | |
| | R | △ | Σ | |
| R | E | * | - | Hole detection |
| | L | ▲ | ▲ | |
| | C | Σ | Σ | |
| | R | △ | Σ | |

| SENSOR S5 AND S6 (RIGHT SIDE) | | | | |
|---|---|---|---|---|
| SENSOR OUTPUT | | TREATMENT | | REM |
| S6 | S5 | S6 | S5 | |
| E | E | - | - | |
| | R | - | * | |
| | C | - | Σ | |
| | L | - | Σ | |
| R | E | * | - | Hole detection |
| | R | * | * | |
| | C | * | Σ | |
| | L | * | Σ | |
| C | E | * | - | Hole detection |
| | R | ▲ | ▲ | |
| | C | Σ | Σ | |
| | L | △ | Σ | |
| L | E | * | - | Hole detection |
| | R | ▲ | ▲ | |
| | C | Σ | Σ | |
| | L | △ | Σ | |

With :
E : Si is empty     >> Empty
L: $Si > 1 + \alpha$     >> Left
C: $1 - \alpha =< Si =< 1 + \alpha$   >> Center
R: $Si < 1 - \alpha$     >> Right
-: Empty
Σ: Normally summation
*: Elimination case
△ Conditional summation only with $S1 < S2 + \beta$ otherwise elimination
▲ Conditional summation only with S5=0 otherwise elimination $\alpha > \beta$ coefficient taking in account the seat real word for surface estimation. An example is $\alpha = 0.25$ and $\beta = 0.125$ With :
E : Si is empty     >> Empty
R: $Si < 1 - \alpha$     >> Right
C: $1 - \alpha =< Si =< 1 + \alpha$   >> Center
L: $Si > 1 + \alpha$     >> Left
-: Empty
Σ: Normally summation
*: Elimination case
△ Conditional summation only with $S6 > S5 - \beta$ otherwise elimination
▲ Conditional summation only with S2=0 otherwise elimination $\alpha > \beta$ coefficient taking in account the seat real word for surface estimation. An example is $\alpha = 0.25$ and $\beta = 0.125$

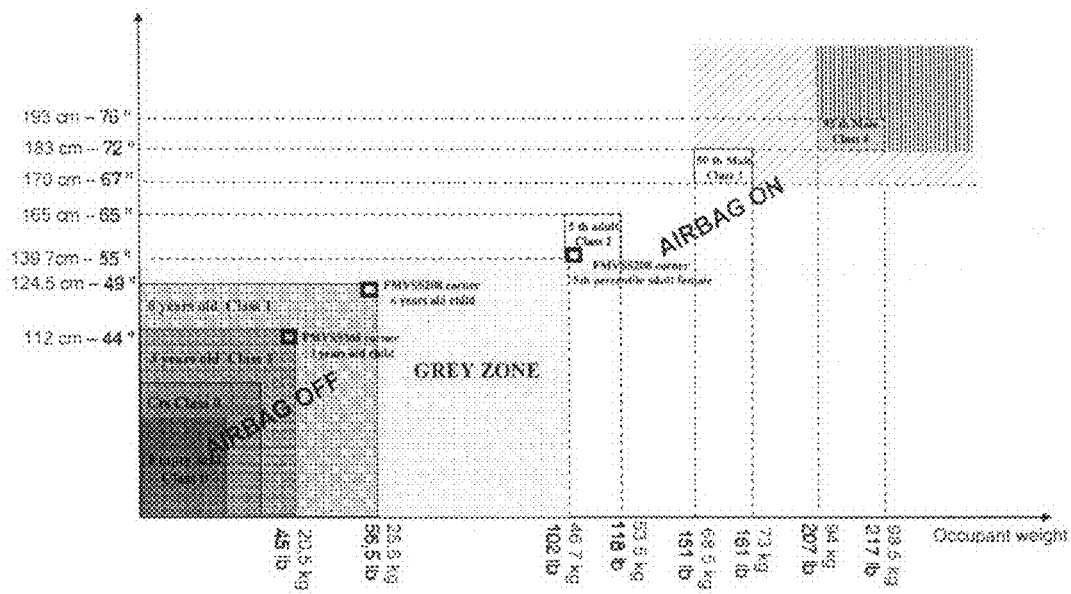
FIG_41
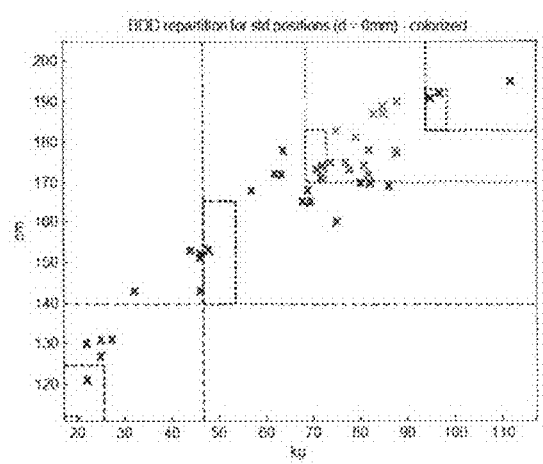
FIG_42

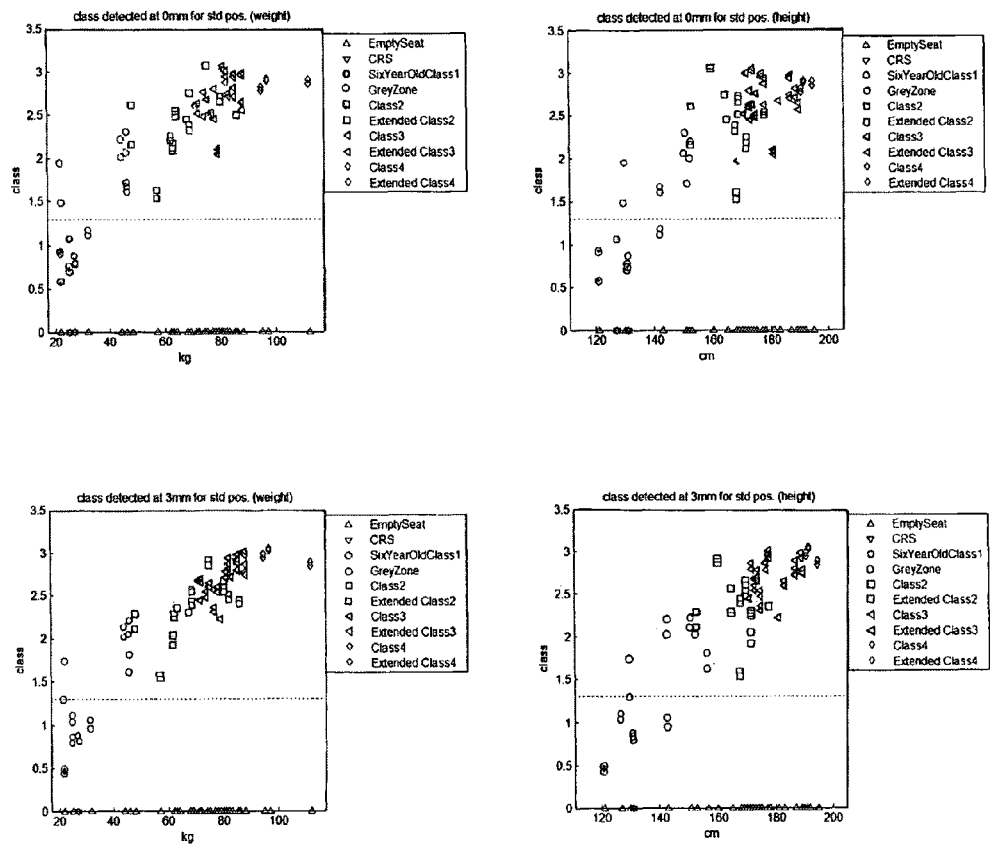
FIG_43
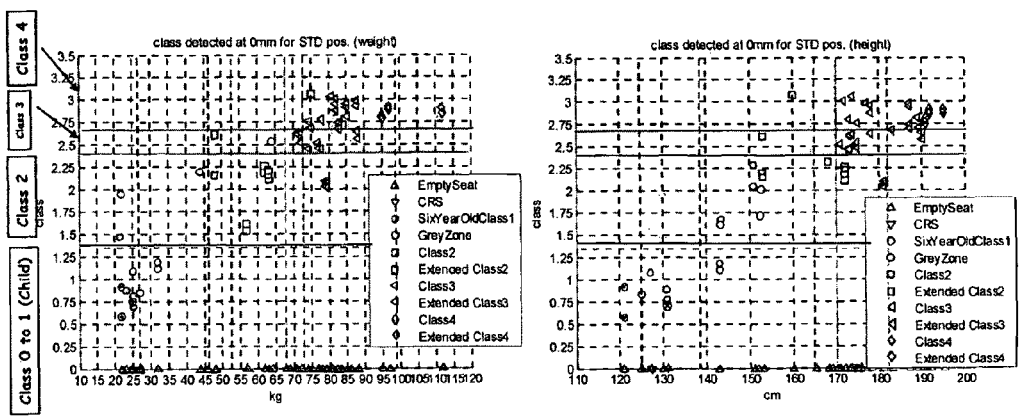
FIG_44

METHOD USING CAPACITIVE SENSORS FOR MORPHOLOGY DISCRIMINATION OF A PASSENGER SEATING IN AN AUTOMOTIVE SEAT

BACKGROUND OF THE INVENTION

1. Field of the Invention

The present invention relates to the technical field of sensors area.

More precisely, the present invention concerns a system and a method to improve the morphology discrimination of a passenger seated in an automotive seat fitted with several capacitive sensors.

A non exclusive implementation of the present invention relates to control the airbag triggering in a car.

2. Description of Related Art

In the last past years, airbag in automotive area were triggered, in case of shock, by means of an accelerometer. This basic triggering didn't take in account the occupant morphology (child, small adult, medium adult, and large adult).

Generally known airbags were triggered even if the seat is empty or occupied by a baby seated in a "CRS" (Child Restrain Seat). This last case very serious is the cause of numerous deaths.

For these reasons henceforth some vehicles are fitted out with a switch allowing disabling airbag triggering when a CRS is mounted in seat. This switch is linked with a light indicator situated on dashboard showing the state of airbag device triggering: "on" state or "off" state.

Since year 2003 a most restricting regulation was launched in US (FMV SS 208 regulation) compelling car manufacturer to fit out at least a third part of global car production with a detecting passenger device called "OCS" (Occupant Classification System).

It is noticed that the airbag must not be triggered in the following conditions:

If the seat is empty,
If the seat is occupied by a baby seated in CRS,
if the seat is occupied by a child less 6 years old (less than 26 kg).

Independently regulations which will be set, business constraints all over the world, lay down an airbag smart triggering; that is to mean:

No air bag triggering:
for an empty seat,
for a seat occupied by a baby seated in CRS,
for a seat occupied by a child less 6 years old (less than 26 kg),
Monitoring the airbag power according to occupant morphology defined as following:
$5^{th}$ percentile class (46-53 kg/1.40-1.65 m) linked to small adult,
$50^{th}$ percentile class (68-73 kg/1.70-1.8 m) linked to medium adult,
$95^{th}$ percentile class (94-98 kg/1.83-1.93 m) linked to large adult.

However at the present time no system or method offers a fully satisfactory solution for that.

The Applicant has filed on Jul. 28, 2005 a French patent application under number FR-0508072, which describes a technical structure of a capacitive sensor allowing detecting if the sensor is covered or not by a target.

The Applicant has also filed on May 17, 2006 a European patent application under number EP06290806.6, which describes a method for determining the surface of a capacitive sensor covered by a target and the distance separating said target and said capacitive sensor and has filed on May 17, 2006 a European patent application under number EP06290807.4, which describes a method for determining the morphology of an occupant in an automotive seat with capacitive sensors. These methods are well suited for operation under standard range of temperature and humidity.

But in practice, some constraints may disturb the discrimination of passenger.

Not restrictively such constraints may be due to a wet obstacle present on the seat, such for example in the case of a passenger (adult or child) seated with a wet raincoat, a passenger coming from beach putting a damp towel on seat before sitting on it, beverage dropping damping partial surface of seat or a shower leading to a damped seat if the window pane is bad shut.

Other constraints may be due to no human occupation on the seat, like metallic object, suit case, pack of bottles of water, etc. provided on the seat.

BRIEF SUMMARY OF THE INVENTION

The aim of the present invention is now to propose means for allowing a more reliable discrimination of the morphology of a passenger seated in an automotive seat fitted with several capacitive sensors, in severe constraints like in the case of wet obstacles covering a seat.

This aim is achieved according to the present invention with a method comprising the steps of providing a set of a plurality of capacitive sensors covering substantially a transversal cross section of the seat, collecting the outputs of said plurality of capacitive sensors provided on the seat, determining the morphology of a target facing the seat on the basis of measured distance separating the target from the sensors and measured surface of the sensors covered by the target, from said outputs, and comparing the determined morphology with at least a reference so as to classify the determined morphology between a plurality of reference ones.

According to another preferential feature, the comparing step of the method of the present invention involves a mathematical function representing a morphology reference.

According to another preferential feature, the comparing step of the method of the present invention involves a 3D reference image representing a morphology reference.

The present invention also relates to a system for implementing the above method as well as a seat for automotive car comprising such a system.

BRIEF DESCRIPTION OF THE DRAWINGS

Other technical features, aims and advantages of the present invention will be understood from the following description which relates to the enclosed drawings wherein:

FIG. 3 illustrates more precisely the implantation of 6 capacitive sensors, each comprising two pixels, on a seat in accordance with a non limitative embodiment of the present invention, FIG. 4 illustrates an example of a realistic profile and of a non realistic profile, FIG. 5 illustrates an example of a mathematical reference function in form of a Bell like function, FIGS. 6, 7 and 8 illustrate measurement corresponding respectively to standard children profiles, standard adult profiles and to standard big adult profiles, FIG. 9 illustrates a table of morphology classification from a parameter issued of a comparison involving a Bell reference function, FIG. 10 illustrates standard children profiles implementing selected erroneous inputs, so as to show the reliability of the process in accordance with the present invention, FIG. 13 illustrates schematically the construction of a mesh 3D image in accordance with the present invention, FIG. 14 illustrates schematically the linear interpolation between two pixel sensors, FIG. 18 illustrates the results of a template method on a 0-36 kg template, FIG. 19 illustrates classification of measured profile in corresponding weight classes, in accordance with the present invention, FIG. 20 illustrates an example of electrical potentials applied to the electrodes of said capacitive sensor during an initial step of a detecting prosecution in accordance with the present invention, FIG. 21 illustrates schematically the individual capacitive components operating in the sensor system of the present invention, FIG. 23 illustrates schematically the relative evolution of electrical outputs issued from the sensor in accordance with the present invention, which are used to determine parameters representative of the temperature and humidity, more precisely FIG. 23a illustrates curves CU1=f(C1), while FIG. 25 illustrates the construction of a look up table taking into account temperature and humidity parameters, more precisely FIG. 25a illustrates curves CU=f(C), FIG. 25b illustrates the definition of the origin of the curves and FIG. 25c illustrates the corresponding look up table, FIG. 26 illustrates the dependency of a relative evolution of electrical outputs issued from the sensor with the relative position of a reference target in regard of the sensor, more precisely FIG. 26a illustrates curves CU2=f(CU1) while FIG. 26b illustrates a sequence of relative displacements of the reference target in regard of the sensor, FIG. 27 illustrates the construction of a look up table determining an initial offset of curve responses in relation with temperature and humidity parameters, more precisely FIG. 27a illustrates some points of curves CU2=f(CU1) while FIG. 27b illustrates the corresponding look up table, FIG. 30 illustrates the performance of the present invention in determining the amount of the surface of the sensor covered by said target, FIG. 31 illustrates the performance of the present invention in determining the distance separating the target from the sensor, FIGS. 38 and 39 illustrate schematically two other cases of partial rejected outputs, FIG. 40 illustrates a Table providing an example of coherence analysis, FIG. 41 illustrates an official regulation, FIG. 42 illustrates a corresponding sample base, FIG. 43 illustrates a data base obtained with the method in accordance with the present invention, FIG. 44 illustrates an example of thresholds applied to such a data base.

DETAILED DESCRIPTION OF THE INVENTION

As indicated above, the present invention proposes a method for reliable discrimination of the morphology of a passenger seated in an automotive seat fitted with several capacitive sensors, in severe constraints like in the case of wet obstacles covering a seat. The present invention allows in particular to control airbag triggering in function of such morphology discrimination.

More precisely as indicated above the present invention proposes a method comprising the steps of providing a set of a plurality of capacitive sensors 100 covering substantially a transversal cross section of a seat, collecting the outputs of said plurality of capacitive sensors 100 provided on the seat, determining the morphology of a target 10 facing the seat on the basis of measured distance separating the target 10 from the sensors 100 and measured surface of the sensors 100 covered by the target 10, from said outputs, and comparing the determined morphology with at least a reference so as to classify the determined morphology between a plurality of reference ones.

Figure 1:
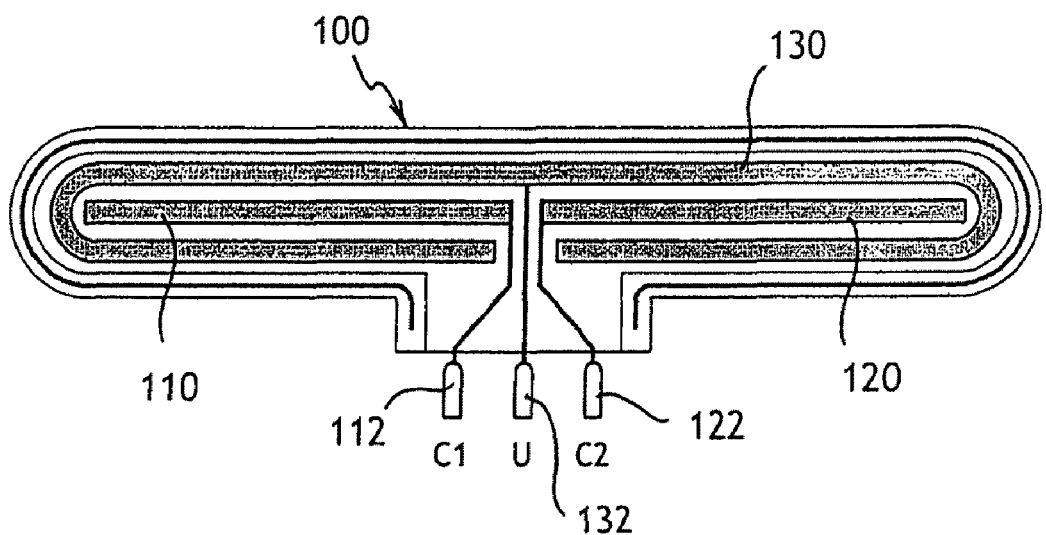
FIG. 1 illustrates a non limitative embodiment of a capacitive sensor according to the present invention.
Figure 2:
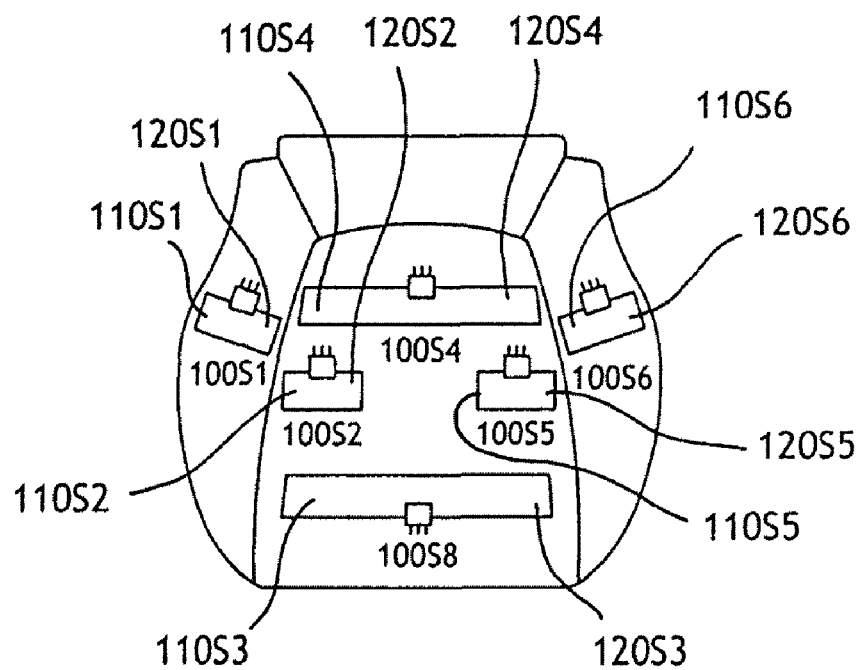
FIG. 2 illustrates schematically the implantation of 6 capacitive sensors on a seat in conformity with an embodiment of the present invention.

An example of capacitive sensor 100 in accordance with the present invention and an example of a set of such capacitive sensors 100 provided on a seat are illustrated on FIGS. 1 and 2. Such capacitive sensor 100 of FIG. 1 and implantation of sensors 100 on a seat illustrated on FIG. 2 will be described more in detail in the following specification.

More precisely the present invention proposes a method comprising preferentially the steps of collecting the outputs of a plurality of capacitive sensors 100 provided on a seat, determining for each capacitive sensors 100 a first value di representative of the distance separating a target 10 from the sensor 100 and a second value Sdi representative of the surface of the sensor 100 covered by the target 10, applying to the second values Sdi representative of the surface of the sensor 100 covered by the target 10 a respective weighting Wi based on the corresponding first value di representative of the distance separating the target 10 from the same sensor 100, and determining the morphology of the target 10 on the basis of the collection of weighted second values SdixWi.

The distance di separating the target 10 and each sensor 100 and the surface Sdi of the target 10 covering each sensor 100, may be obtained by any efficient means.

According to the present invention such distance di separating the target 10 and each sensor 100 as well as the surface Sdi of the target 10 covering each sensor 100 are preferentially obtained with a method which includes means for compensating drifts caused by temperature and humidity environment. Indeed the inventors have uncovered that generally capacitive measures are very sensitive to temperature and humidity environment.

In the following description we will first describe A) the method in accordance with the present invention to discriminate the morphology of a passenger seated in an automotive seat fitted with several capacitive sensors, in severe constraints like in the case of wet obstacles covering a seat, and we will describe in a second time B) a preferential and non limitative method to obtain the distance di and the surface Sdi, and in a third time C) a preferential and non limitative method to determine the morphology of an occupant on the basis of such distance di and surface Sdi.

A. Discrimination of the Morphology of a Passenger Seated in an Automotive Seat Fitted with Several Capacitive Sensors, in Severe Constraints Like in the Case of Wet Obstacles Covering a Seat The method in accordance with the present invention is directed to reliable discrimination of the morphology of a passenger seated in an automotive seat fitted with several capacitive sensors, in severe constraints like in the case of wet obstacles covering a seat.

This method allows for example to resolve the issue of a "Children seated over a wet obstacle on a seat". In other words, the method in accordance with the present invention allows to detect the right classification of an occupant of a seat even in a case of wet towel presence.

One of the problems that may remain with the implementation of the surface-distance determination method disclosed in European patent applications EP06290806.6 and EP06290807.4 is the wet obstacle issue. Indeed whenever a wet obstacle is present on a seat, the surface-distance determination method can lead to erroneous detection. In order to solve that problem, a new method completing surface-distance determination method has been developed. This method is described here after.

Considering:

The position of probes 100 on a seat, as illustrated on FIGS. 2 and 3, which covers substantially the cross section of a seat (this position will be described more in detail in the following specification)

That each probe 100 includes 2 pixels 110S1, 120S1; 110S2, 120S2; 110S3, 120S3; 110S4, 120S4; 110S5, 120S5; 110S6, 120S6 (as described in a non limitative example in patent: FR-0508072)

The different responses of each sensor 100 resulting from the application of electric dc fields illustrated on FIG. 20 and treatment disclosed in patent FR-0508072 and EP06290806.6 (which will be also described more in detail in the following specification), one can obtain a transversal profile measurement of a passenger buttock.

As a passenger cannot present any kind of shape, it is possible to recognize a correct passenger buttock profile even if the profile measurement is perturbed by the distance or a wet obstacle. Furthermore as the buttock profile is linked to the passenger morphology, it should be possible to estimate the passenger morphology.

First of all non realistic profile measurement may be rejected. FIG. 4 illustrates an example of a realistic profile measurement which may be retained for further prosecution and of a non realistic profile measurement which must be rejected. Of course profile measurements presenting holes are not realistic as well and must be also rejected.

At this point, it is possible to postulate that a realistic profile measurement must fit a given shape corresponding to a reference.

And comparing a determined profile measurement corresponding to a measured morphology with at least such a reference allows to classify the determined morphology.

The reference may correspond to numerous embodiments in accordance with the invention.

According to a non limitative example in accordance with the present invention, the reference is a mathematical functions S(p) (wherein p is the pixel index).

Once the reference shape is chosen by the way of such mathematical function, one can by fitting the reference shape to the profile measurement, estimate whether the profile measurement is likely to correspond to that reference shape. It can be done for instance by calculating an error criteria (typically a mean square criteria) that will tell whether the profile measurement is likely or not likely to correspond that reference shape.

In addition to the likeliness test, it is possible by considering the fitting parameters values to quantify the measured shape or profile. In other words, it is possible to give a measurement of the profile that can be correlated to the passenger morphology.

One specific mathematical function has been considered in accordance with the present invention. It was chosen because of its shape that is likely to fit a passenger buttock profile as well as because of its properties.

The function considered is a "Bell like function" (eq 1) of order two or more.

This Bell like function of order n is illustrated on FIG. 5 for order 2 and 4. It corresponds to:

$$S(p) = \frac{ba}{a + (p - m)^n} \qquad (1)$$

wherein:
a depends on the inflexion of the bell
b is the maximal value of S
m is the index value p for which S(p) is maximal.

Of course the above Bell like function S(p) may be replaced by any other equivalent function, such as and not restrictively a Gaussian function.

This Bell like function is sharp on the edges as illustrated on FIG. 5. This is interesting since the inflexion (parameter "a") which is the one that can be used for a morphology classification depends on the edges sharpness. In addition, when the order increases, the Bell like function presents an interesting flat part around its maximal value (see FIG. 5).

Considering equation (1), as the parameter "m" centers the function, it can be estimated by taking the mean value.

The parameter "b" can easily be deduced from the measured profile as well.

As the parameter b is the maximal value the function can take, it is possible to use for instance: b=max(P(round(m)−1), P(round(m)), P(round(m)+1)) in order to take into account that the maximal value of the profile does not necessarily coincide with the medium pixel (for example pixel number four in the case of a measure implementing height pixels referenced from 0 to 8).

The parameter "a" cannot be so simply estimated from the measured profile.

As there is only one a parameter left to fit, it may be possible to calculate a by using an error minimizing algorithm.

To do this work we can use the following prosecution to estimate "a".

The surface S under the measured profile is worth:

$$S = \sum_i P_i \quad (2)$$

The surface $S_b$ under the Bell like function is worth:

$$S_b = \int_1^8 \text{Bell}(p)dp = b\sqrt{a}\left(\arctan\left(\frac{m-1}{\sqrt{a}}\right) - \arctan\left(\frac{m-8}{\sqrt{a}}\right)\right) \quad (3)$$

By equalizing equation (2) and equation (3): S=$S_b$, one can obtain the parameter "a". Equalizing those two equations can be easily performed by using a lookup table for $S_b$. This method presents no convergence problem.

The Bell like function (order 2) has been applied to selected measurements from a seat data base recorded. Here again, the selected measurement correspond to standard children profiles (FIG. 6), standard adult profiles (FIG. 7) and to standard big adult profiles (FIG. 8).

Considering these three FIGS. 6, 7 and 8, one can see that the fitting is correct. The mean square error remains inferior to 4% in all cases. Furthermore the "a" parameter which is reported in the table of FIG. 9 clearly allows to morphologically classify the passenger whatever the distance.

Indeed the "a" parameter is below 3 for children, and over 20 for big adults. "Standard" adults "a" parameter values stand in between 3 and 20 (about 5).

The robustness, that is to say the resistance of the above method in accordance with the present invention to "incorrect profiles" has been tested by introducing erroneous points in the profiles as presented on FIG. 10. More precisely FIG. 10 illustrates a standard children profile with error simulating a hand on bolster.

In this situation, the classification is erroneous. The children would be classified as an adult. This example shows it is important to consider the error in the likeliness test. Indeed, as the profile measurement is not realistic, the error in that case is not less that 30% which is much larger than for the likely profiles presented before. The error allows rejecting the erroneous profile measurements that will not be classified.

Figure 11:
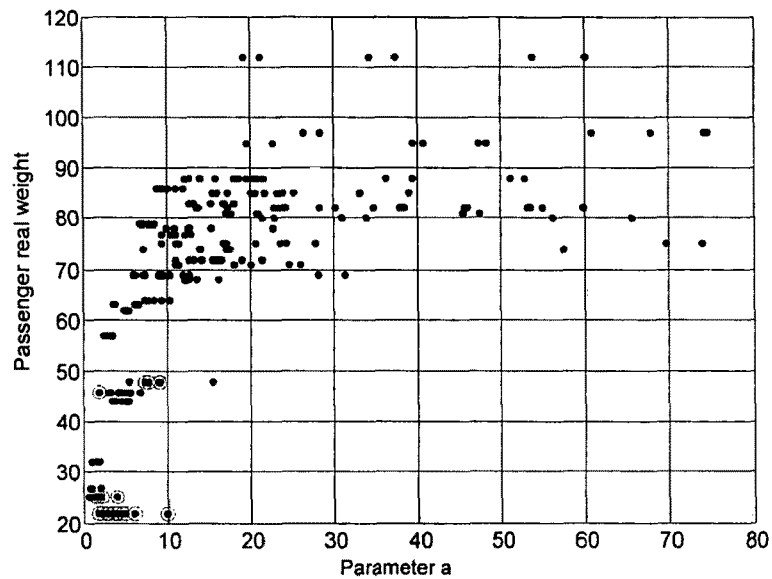
FIG. 11 illustrates the results of a morphological classification in accordance with the present invention implementing a Bell reference function.
Figure 12:
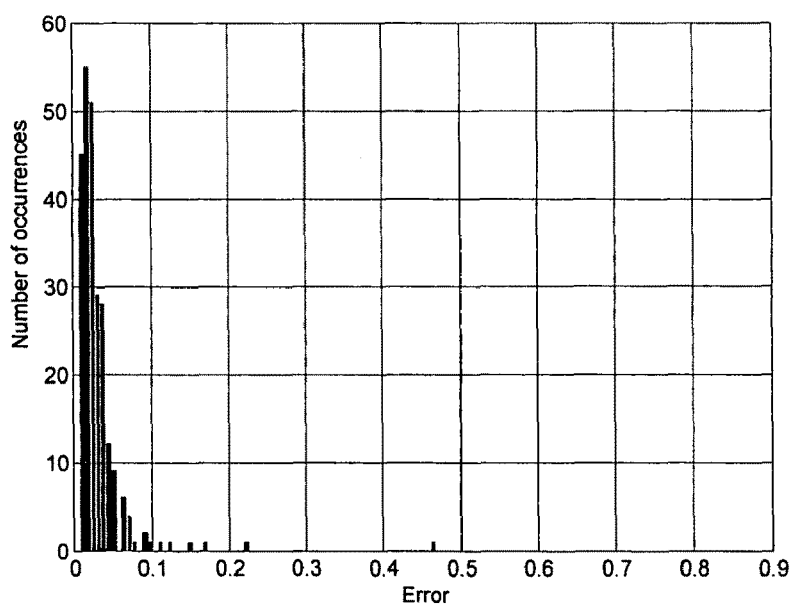
FIG. 12 illustrates the corresponding error distribution.

The method using Bell like function described in the prior section has been applied to a data base recorded in a seat in order to test its performances. The results are presented in FIG. 11, and the corresponding error distribution in FIG. 12. One can see that most of the errors are grouped below 6%. This is the level that has been used to reject the points in FIG. 11. In this figure, the rejected points are circled. A correct classification is therefore obtained by only considering the profiles that are not rejected. The classification is correct because it allows separating children from small adults and big adults. All passenger are all classified alike over 70 kg.

The above disclosed implementation of the present invention comprises a comparing step which involves a mathematical function representing a morphology reference.

According to another preferential implementation of the present invention, the comparing step involves a 3D reference image representing a morphology reference.

Indeed in order to improve results, the inventors furthermore propose to deal with an image template prosecution. This image template prosecution applies the above verisimilitude or likeliness concept using all the seat probes 100.

By using all the probes 100, no information from the measurement is lost.

As finding a verisimilar function that works in three dimensions (up down and right left) is far more difficult than with two dimensions (a profile), the inventors propose to implement the following prosecution.

To do so a x.y mesh (for example a 10 by 11 mesh) is used to create the profile. The mesh step is chosen preferentially in accordance with the actual probe spacing as shown in FIG. 13.

An image of the passenger profile is realized as follow by interpolation of the outputs issued by the sensors.

For the step of the mesh where there is no probe, the pixel value is interpolated from the nearest probes. For instance, the pixel {2,10} (Horizontal coordinate, vertical coordinate) of FIG. 13 is obtained by calculating the mean value between the measured pixels 110S4 and 120S1. When there is more than one pixel to interpolate between two real pixels such as for pixels {3,3} {3,4} and {3,5}, the intermediate pixels values are linearly interpolated between the measured pixels 110S2 and 110S3 over the distance separating them as shown on FIG. 14.

In some cases, as for pixel {5,8}, the pixel is interpolated between a measured pixel (here: pixel 110S4) and an interpolated pixel (here: pixel {5.7}). This yields a more realistic interpolation.

Finally, the image is set to the measured pixel value where there is a probe and to zero in the remaining pixels (greyed in FIG. 13).

There are three possible kinds of image.

Firstly the image can simply be obtained by interpolating the data as described above. This way leads to a standard image.

Secondly it is possible as well to create a dynamic image that emphasize on the measurement dynamic by subtracting the smallest measured pixel value. This way leads to an image which is restricted to its dynamic part.

Finally one can compute a dynamic relative image by normalizing the profile between 0-100%.

Any of those three or all three images can be computed from a single measurement. One should use one of the three kinds of image as needed. For instance, the dynamic profiles are fewer dependants on the passenger distance to the seat, but the signal intensity is lost. It is possible as well to use two or more kinds of image as well. An example of standard profile is presented on FIG. 15.

Figure 15:
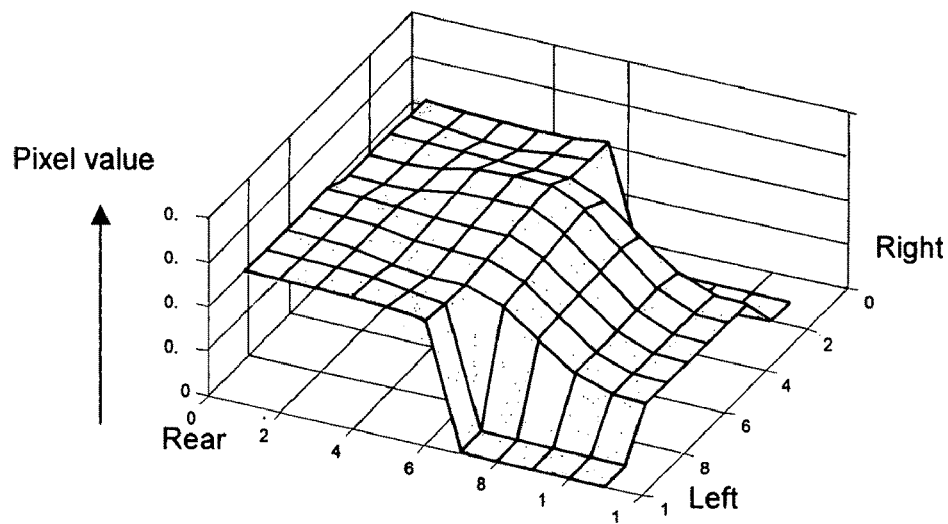
FIG. 15 illustrates an example of 3D standard profile.

As there is no simple mathematical function that simply yields a shape such as the one presented in FIG. 15, the inventors propose an alternate solution: "a template method" and "a reference plane method" which will be now described.

For both methods, the goal is firstly to determine whether the image corresponding to a profile measurement is likely or not, and secondly if the image is likely to give measurement of the passenger morphology.

To determine if an image corresponding to a profile measurement is verisimilar; the measured image is compared to a set of reference images obtained from measurement in standard known positions for different morphologies. If the comparison yields poor results then the image is not very-similar and is rejected. When the comparison is correct, the comparison result is used to classify the measured image in the morphology class corresponding to the morphology used to create the reference image.

Figure 16:
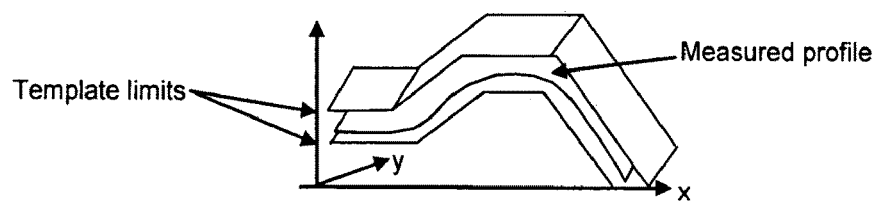
FIG. 16 illustrates a 3D measured profile versus two maximal and minimal template limits.
Figure 17:
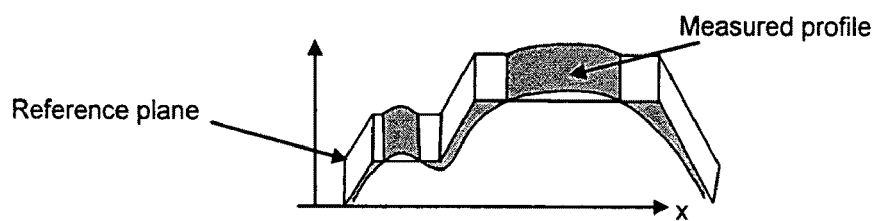
FIG. 17 illustrates a 3D measured profile versus a 3D reference.

The "template method" consists for each weight class (for example 0 kg-36 kg, 36 kg-60 kg, 60 kg-80 kg, 80 kg-120 kg), to elaborate a maximal template limit and a minimal template limit. The measured images are compared to the template by counting the number of pixels that belong to the template (i.e. the number of pixels between the maximal template limit and the minimal template limit) as illustrated in FIG. 16. The number of pixels belonging to the template is expressed as a percentage of the total number of pixels. Considering the number x.y of pixels (for example 10×11) in each image, one pixel represents about 0.9% of the total template.

Another method consists in calculating a distance to a "reference plane" which is the average image for the morphology to which the measurement is compared.

The distance to the reference plane in then calculated for example as follows:

$$D = \sum_i (P_{RP}(i) - P_1(i))^2 \qquad (4)$$

In equation (4), $P_{RP}(i)$ are the pixels of the reference plane, $P_1(i)$ are the pixels of the measured image, and D is the distance of the image to the reference plane. Here again the distance is expressed in form of a percentage of the maximal value of the distance. This facilitates comparisons between different reference planes. In that case 0% means that all pixels of the measured image are on the reference plane. 100% would mean that all pixels are whether worth zero or the maximal measurement value. Note that it could have been possible to use a classical normalized version for the distance:

$$D = \frac{\sum_i (P_{RP}(i) - P_1(i))^2}{\sum_i P_{RP}(i)^2} \qquad (5)$$

This method yields smoother comparisons than the template method presented previously.

The Image "template prosecution" consists in applying the "templates methods" or the "reference plane methods" to the data base recorded in seat.

FIG. 18 displays the results obtained when applying the template method on a 0-36 kg template. One can see that children fit the 0-36 kg template. In the final prosecution, the measurements are compared to the templates starting by the heavy ones.

A measurement that fits with a template is classified in the corresponding weight class. The measurements that fit no template are not classified.

The results obtained in accordance with the above method of the present invention are presented on FIG. 19.

B. Determination of Distance di Separating a Target From Each Sensor and of Surface Sdi of the Target Covering Each Sensor.

The present invention uses a capacitive sensor structure 100.

This capacitive sensor 100 may be in conformity with a plurality of embodiments.

Preferentially the capacitive sensor 100 of the present invention comprises at least two electrodes 110, 120, in conformity with the disclosure of French patent application 05 08072, covering complementary respective areas of a sensed zone so as to form two balanced pixel sensors. The function of such two electrodes 110, 120 and corresponding balanced pixel sensors will be described more in detail in the following specification.

Preferentially the capacitive sensor 100 of the present invention comprises 3 electrodes 110, 120, 130 as illustrated on FIG. 1, in conformity with the general disclosure of French patent application 05 08072. Of course the present invention is not limited to the specific embodiment and shape illustrated on FIG. 1.

The two electrodes 110 and 120 correspond to main electrodes. They cover complementary respective areas of a detection or sensed zone. More precisely the two main electrodes 110 and 120 are preferentially made of rectilinear tracks. The two main electrodes 110 and 120 are preferentially aligned. Preferentially the two main electrodes 110 and 120 have the same surface. However the present invention may be implemented with main electrodes 110, 120 having non identical surfaces, taking into account the ratio between the respective surfaces of the two main electrodes 110 and 120 in the detecting prosecution.

The third auxiliary electrode covers at least substantially both the two complementary respective areas of the two main electrodes 110 and 120. More precisely as illustrated on FIG. 1, preferentially the third electrode 130 surrounds said two main electrodes 110 and 120.

The third electrode 130 is connected at its middle part to a transverse connecting track 132. Similarly the two main electrodes 110 and 120 are connected at their adjacent ends to transverse respective connecting tracks 112 and 122.

Such a sensor 100 comprising only 3 outputs 112, 122 and 132 may deliver a number of output information greater than 3, corresponding to capacitor values depending of the connection of said electrodes 110, 120 and 130. French patent application 0508072 for example discloses the implementation of 8 output information from similar electrodes 110, 120 and 130.

These capacitor values are measured by applying judiciously an electric controlled dc field between some electrodes 110, 120, 130 and subsequently measuring and counting up electric charges on dedicated electrodes 110, 120, 130, after breaking said electric dc field.

These electric charges can be converted in voltage for example but not restrictively by using the means according to arrangement defined in document WO-A-00/25098.

In other words preferentially the present invention method converts the electric charges accumulated on a selected electrode 110 or 120, into an electric output signal, with supplying means suitable to apply a controlled dc electrical voltage on selected electrodes, integrator means including a capacitive switching system and control means suitable to define cyclically, at a selected frequency, a sequence of two following steps:

a first step wherein the supplying means are connected to at least one electrode so as to apply an electric field on this electrode and to accumulate electric charges on this electrode, and a second step wherein the supplying means are not connected to the selected electrode, and this selected electrode is connected to the input of the integrator means to transfer the electrical charges into the integrator means.

More precisely although the disclosure of French patent application 0508072 recommends to use 8 combinations of measurements from a similar sensor, the present invention implements preferentially only 4 combinations of measurements upon the sensor. Indeed the inventors have uncovered that such 4 combinations are sufficient to localise precisely the target in view of the sensor. These 4 combinations which are schematically illustrated on FIG. 20 wherein Vf corresponds to an electric dc potential and G corresponds to ground (0 volt) potential, are listed here after:

(1) Phase C1 Get with the Following Way:

Application of Vf on electrodes 110 and 120, and of G on electrode 130.

Removal Vf from electrodes 110 and 120 and G from electrode 130.

Put electrodes 110, 120 and 130 in high impedance state (totally left open) in order to keep all charges trapped in electrodes.

Count up the charges trapped on electrode 110. This result is called C1

(2) Phase CU1 Get with the Following Way:

Application of Vf on Electrodes 110, 120 and 130.

Removal Vf from electrodes 110, 120 and 130.

Put electrodes 110, 120 and 130 in high impedance state (totally left open) in order to keep all charges trapped in electrodes.

Count up the charges trapped on electrode 110. This result is called CU1.

(3) Phase C2 Get with the Following Way:

Application of Vf on electrodes 110 and 120, and of G on electrode 130.

Removal Vf from electrodes 110 and 120 and G from electrode 130.

Put electrodes 110, 120 and 130 in high impedance state (totally left open) in order to keep all charges trapped in electrodes.

Count up the charges trapped on electrode 120. This result is called C2.

(4) Phase CU2 Get with the Following Way:

Application of Vf on electrodes 110, 120 and 130.

Removal Vf from electrodes 110, 120 and 130.

Put electrodes 110, 120 and 130 in high impedance state (totally left open) in order to keep all charges trapped in electrodes.

Count up the charges trapped on electrode 120. This result is called CU2.

On FIG. 20 bold character identify the electrode where the charges are measured.

The complete sensor system is illustrated in the form of an electric equivalent scheme of individual capacitive components on FIG. 21, wherein:

$C_{BG}$ corresponds to the capacitive component between the ground (for example the chassis of a car) and a target 10 (for example a passenger seated on a seat of a car), $C_{1B}$, $C_{2B}$ and $C_{UB}$ correspond respectively to the capacitive component between the target 10 and the electrodes 110, 120 and 130, $C_{1G}$, $C_{2G}$ and $C_{UG}$ correspond respectively to the capacitive component between the ground and the electrodes 110, 120 and 130, and $C_{1U}$, $C_{12}$ and $C_{2U}$ correspond respectively to the capacitive component between the electrodes 110 and 130, between the electrodes 110 and 120, and between the electrodes 120 and 130.

Each of the 4 above combinations may be expressed as the summation of capacitive components composing the sensor system illustrated on FIG. 21:

$$C = C_{1U} + C_{1B} + C_{1G} \quad (1)$$

$$CU1 = C_{1B} + C_{1G} \quad (2)$$

$$C2 = C_{2U} + C_{2B} + C_{2G} \quad (3)$$

$$CU2 = C_{2B} + C_{2G} \quad (4)$$

The inventors, after a lot of searches and experiments, have uncovered that using and combining some relevant information issued from the above 4 combinations can successively:

1—Get information about drift caused by temperature and humidity,

2—From this information, compensate drift on data, and

3—From compensated data, determine, on reliable basis, surface of a target covering the sensor as well as the distance separating the sensor from the target.

More precisely the inventors have uncovered that in order to know the behavior of these 4 phases versus surface occupation, distance, temperature and humidity variation, it is necessary to run a measurement campaign to characterize them.

Figure 22:
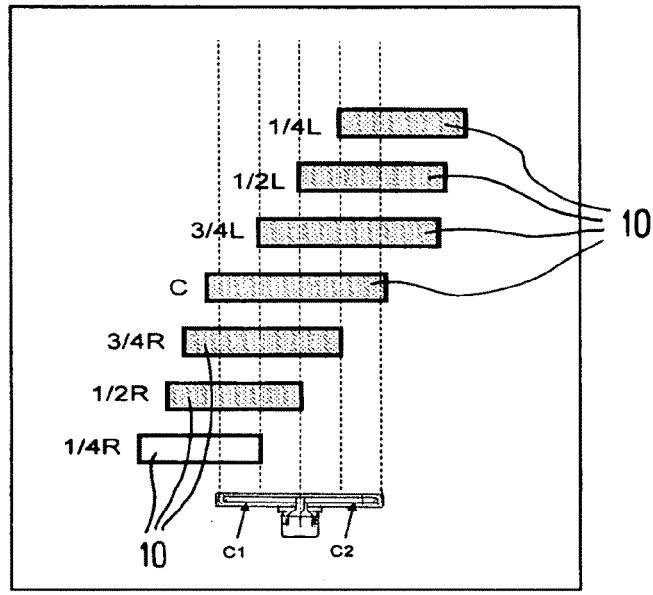
FIG. 22 illustrates schematically the stepped displacement of a referenced target in regard of the sensor during a preparation part of the present invention.

For this, the inventors took a conductive reference target 10 having a length which is equal to the length of the sensor 100 (i.e. equal to the length of the electrode 130 and equal to the sum of the lengths of the two electrodes 110 and 120 as illustrated on FIG. 22).

The inventors successively displace step by step said reference target 10 in regard of the sensor 100, in parallel to the longitudinal direction of the sensor 100. Arbitrary the inventors take a resolution of ¼ of sensor length and m steps, with m=7 in the non limitative example, for this displacement and surface variation. But of course any other resolution and/or number m of steps must be taken.

The displacement starts arbitrary by left side and covers the sensor 100, on m successive steps, by incremental step of ¼ of surface.

On FIG. 22:

¼ L means ¼ of sensor length covered by left side.

½ L means ½ of sensor length covered by left side.

¾ L means ¾ of sensor length covered by left side.

C (for "center") means the target covers totally the sensor 100.

¾ R means ¾ of sensor length covered by right side.

½ R means ½ of sensor length covered by right side.

¼ R means ¼ of sensor length covered by right side.

Moreover at each step of the m steps of this relative displacement, the inventors move the reference target 10 progressively away the sensor 100, step by step, from a distance Z of 0 mm (contact) to 100 mm (considered as infinite distance). Arbitrary in a non limitative example, the inventors displaced the target 10 from the sensor 100 by a number n=38 steps, from O mm to 100 mm.

And for each step of relative covering surface (m steps) and distance (n steps), the inventors change temperature and humidity. Arbitrary the inventors combined o=4 different values of temperature (25° C., 40° C., 55° C. and 70° C.) with p=3 different values of humidity (RH=50%, 70% and 95%) leading to o.p=4×3=12 combinations of temperature and humidity.

All the responses corresponding to the 4 identified phases (C1, CU1, C2 and CU2) are recorded for each of the m=7 relative positions illustrated on FIG. 4, that for each of n=38 respective distances Z, and all that for each of o×p=12 combinations of values of temperature and humidity.

The inventors have determined that the 4 phases C1, CU1, C2 and CU2 lead to 3 typical combinations.

First is CU1=f(C1).
Second is CU2=f(C2).
Third is CU1=f(CU2).

Figure 23A:
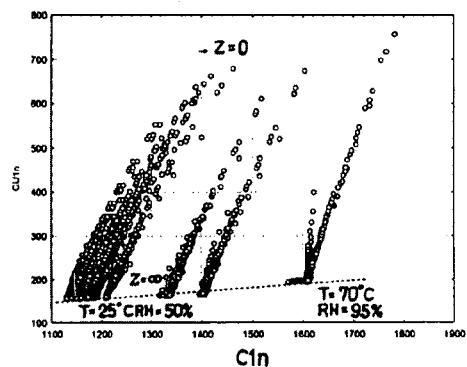
Figure 23B:
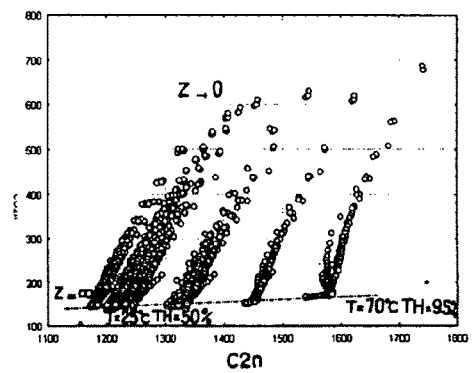
FIG. 23b illustrates curves CU2=f(C2)

Considering CU1=f(C1) (pixel 1) and CU2=f(C2) (pixel 2) (see FIG. 23) the inventors noticed that the slopes $$a_1 = \Delta CU1/\Delta C1$$

$$a_2 = \Delta CU2/\Delta C2$$

are practically constant, whatever sensor surface covered, distance, temperature and humidity are.

However the origin of each curves CUo for distance approaching the infinite is moving on, i.e. depends, with temperature and humidity.

This observation of the inventors leads to a standout characteristic since the above 4 phases allow to obtain information about temperature (T° C.) and humidity (RH %) couple: (T° C.,RH %)=f(CUo)

This characteristic may be explained with the phase ratio $CU1/C1=(C_{1B}+C_{1G})/(C_{1U}+C_{1B}+C_{1G})$.

The same terms are present at numerator and denominator, except that denominator includes further term $C_{1U}$ which represents the local capacitor between electrodes 110 and 130 which is sensitive at temperature and humidity (dependence of dielectric constant of support of the electrodes with temperature and humidity)

The same characteristic applies for pixel 2, since $$CU2/C2=(C_{2B}+C_{2G})/(C_{2U}+C_{2B}+C_{2G}).$$

Figure 24:
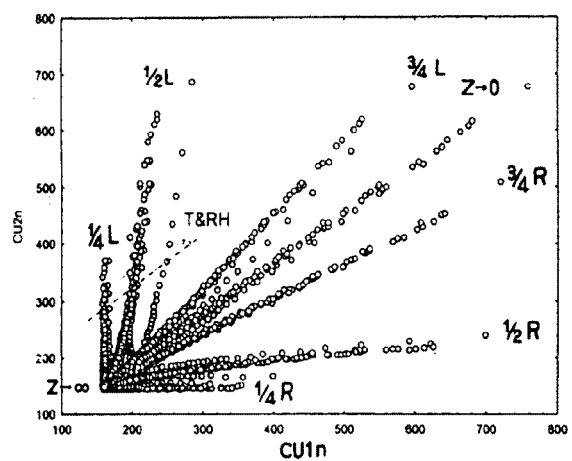
FIG. 24 illustrates schematically the relative evolution of other electrical outputs issued from the sensor in accordance with the present invention, which are used to determine the distance separating the target from the sensor and/or the amount of the surface of the sensor covered by said target.

Now considering CU2=f(CU1) (see FIG. 24) the inventors noticed:

- the angle α of CU2 versus CU1 is function of the surface of the sensor 100 covered by the reference target 10 (here step of resolution is ¼ of sensor length) whatever distance, temperature and humidity are,
- the origin O of curves CU2 and CU1 are slightly depending of temperature and humidity, but the inventors determined that such offset can be compensated by means of information coming from CU1=f(C1) and CU2=f(C2),
- the position of a point P in plan CU2=f(CU1) is function of distance Z from target 10 to sensor 100.

This characteristic can be explained with the phase ratio CU2/CU1 since $$CU2/CU1=(C_{2B}+C_{2G})/(C_{1B}+C_{1G}).$$

When no target 10 is in front of the sensor 100 (distance=infinite) slightly the same terms are at numerator and denominator of CU2/CU1:

$$C_{2G} \# C_{1G}$$

$$C_{1B}=C_{2B}=0$$

In case a target 10 partially covers the sensor 100, $C_{1B}$ is different from $C_{2B}$ because these capacitors depend on the surface of the target 10 covering each pixel electrode 110 or 120. These two capacitors measure the unbalanced surface covering pixel 110 and pixel 120.

The inventors have uncovered that these 3 outstanding characteristics can:

compensate sensor drift caused by temperature and humidity, calculate surface occupied by a target facing the sensor 100, and calculate distance between sensor 100 and a target.

More precisely on the basis of the above established facts, the inventors propose a method which is split in 2 parts: a "Preparation" part and a "Detection" part. These two parts will be described more in detail now.

1. Preparation Part

This preparation part is divided in 3 main steps: 1) the generation of a Temperature and Humidity Look Up Table "LookTRH", 2) the generation of 3 Look Up Tables corresponding to the Angle ("LookAngle") and the Origins (OCU1,OCU2) of curves Cu=f(C) ("LookOCU1" and "LookOCU2") and 3) the generation of a Distance Look Up Table ("Lookabs").

11—Step 1: Temperature and Humidity Look Up Table Generation "LookTRH".

The aim of this Table is to give a correspondence between real capacitive measures and the temperature and humidity parameters so as to compensate drift due to the temperature and humidity.

Construction of this Table may be operated according to various process. A specific one of such process will be described as step 1 in regard of the illustration of FIG. 25.

From the 2 curves:

$$CU1=f(C1)$$

$$CU2=f(C2)$$

The 2 following slopes are calculated $$\alpha 1 = \frac{\Delta C1}{\Delta CU1}$$

$$\alpha 2 = \frac{\Delta C2}{\Delta CU2}$$

After that interception of the 2 curves with abscissa, B1 and B2, is calculated.

writing $CU1=\alpha_1 C1+\beta_1$, abscissa $B1=\beta_1/\alpha 1$
writing $CU2=\alpha_2 C2+\beta_2$, abscissa $B2=\beta 1/\alpha 2$ The average B=(B1+B2)/2 of the two calculated abscissa is determined.

Then for each o×p couple of temperature and humidity, a Look Up Table of B=(B1+B2)/2 is constructed as illustrated on FIG. 25. With o×p combinations of temperature and humidity, the Look Up Table LookTRH has of course o×p inputs. In other words the shape of the LookTRH Table is o×p versus 2, i.e. an output B for each one the o×p inputs.

Of course the specific table illustrated on FIG. 25 is only an example and may not be considered as limitative.

12—Step 2: Angle and OCU1,OCU2 Look Up Tables Generation (See FIG. 8)

The aim of Angle Look Up Table is to give a correspondence between a real capacitive measure or combination of real capacitive measures and the amount of target surface covering a sensor, for a plurality of temperature and humidity parameters.

Construction of this Table may be operated according to various process. A specific one of such process will be described in regard of the illustration of FIG. 26.

To construct the Angle Look Up Table "lookAngle", the angle $\Delta m=\Delta CU2/\Delta CU1$ is calculated from the curves CU2=f (CU1) illustrated on FIG. 26a, for each o×p couple of temperature and humidity of Look Up Table "LookTRH" and for each of the m relative positions between the reference target 10 and the sensor 100 illustrated on FIG. 26b. FIG. 26b illustrates m=7 relative positions, varying from one to the other of ¼ of the length of the reference target 10. With o×p combinations of temperature and humidity and m relative positions, the Look Up Table LookAngle has o×p×m inputs. In other words the shape of the LookAngle Table is o×p×m versus 2, i.e. an output Δm for each one the o×p×m inputs. In practice such Look Up Table may be divided for example into o×p elementary Look Up Table having each m inputs.

Of course the invention is not limited to this specific embodiment.

Then the inventors propose to construct two Tables LookOCU1 and LookOCU2 to give a correspondence between the abscissa and ordinate origins of the curves CU1 and CU2, with a plurality of temperature and humidity parameters.

Construction of this Table may be operated according to various process. A specific one of such process will be described in regard of the illustration of FIG. 27.

More precisely the inventors propose a) to calculate and trace a line CU2=f (CU1) for m=C (for all o×p points of T/RH), b) to calculate and trace for each m a line for all o×p points of T/RH and c) to calculate the intersection of slope C and all other line m for all o×p points of T/RH.

Then for each index T/RH, the point position averages of the abscissa origin OCU1 and the ordinate origin OCU2 of the curves CU2=f(CU1) (see FIG. 27) are stored in two Look Up Tables called "LookOCU1","LookOCU2", as illustrated on FIG. 27b.

With o×p combinations of temperature and humidity, the Look Up Tables LookOCU1 and LookOCU2 have o×p inputs. In other words the shape of the LookOCU1 and LookOCU2 Tables is o×p versus 2, i.e. an output "average of origin OCU1 or OCU2" for each one the o×p inputs.

13—Step 3: Distance Look Up Table Generation Lookabs

The aim of this Table is to give a correspondence between a real capacitive measure or a combination of capacitive measures and the distance separating a target from a capacitive sensor.

Figure 28:
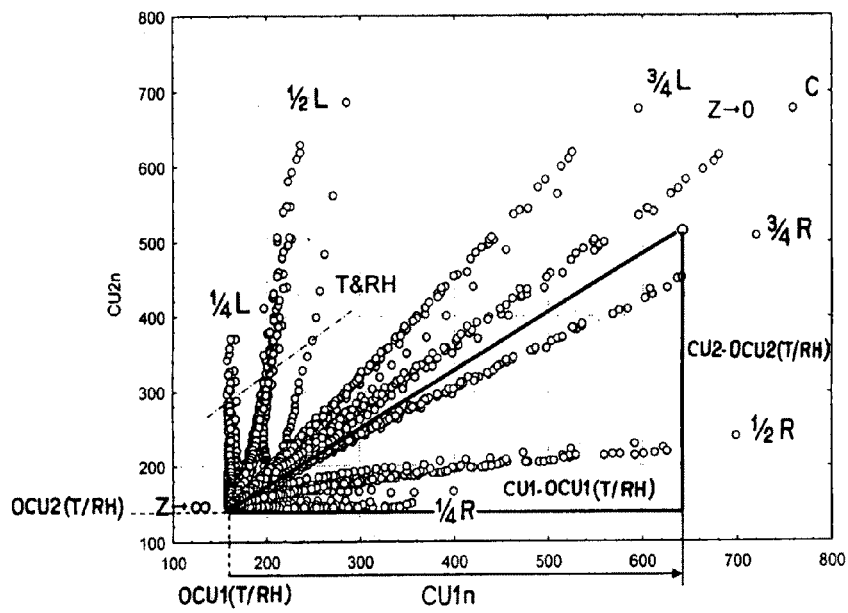
FIG. 28 illustrates the determination of the distance separating a target from the sensor on the basis of the combination of outputs issued from the capacitive sensor.

Construction of this Table may be operated according to various process. A specific one of such process will be described as step 3 in regard of the illustration of FIG. 28.

This process involves a calculation on the basis of a theorem known as Pythagore theorem.

The inventors propose to calculate the distance separating the target 10 from the sensor 100 on the basis of a trigonometric function involving the values CU1 and CU2 corrected by specific abscissa origin OCU1(TRH) and ordinate origin OCU2(TRH).

Considering CU2=f(CU1) and the previous Look Up Tables "LookTRH", "LookAngle", "LookOCU1" and "LookOCU2", a value $$ABS=\sqrt{(CU1-OCU1(TRH))^2+(CU2-OCU2(TRH))^2}$$

is calculated for each surface position m (1 to 7 in the specific case illustrated on the drawings), for each couple of T/RH (12 in the above described case) which define the origins OCU1 and OCU2 and for each distance (38 in a specific and not limitative case).

The value ABS corresponds to the distance between the target 10 and the sensor 100.

All the values calculated for ABS are stored in a Look Up Table called "LookAbs".

With o×p combinations of temperature and humidity, m steps of relative displacement and n step of distances, the Look Up Table Lookabs has o×p×m×n inputs. In other words the shape of the Lookabs Table is o×p×m×n versus 2, i.e. an output ABS for each one the o×p×m×n inputs. In practice such Look Up Table may be divided for example into o×p elementary Look Up Table having each m×n inputs.

In summary the preparation part leads to construction of 5 Look Up Tables: "LookTRH", "LookAngle", "LookOCU1", "LookOCU2", "LookAbs" and 2 characteristics parameters: α1, α2 (slope of curves CU1=f(C1) and CU2=f(C2)).

With these 5 Look Up Tables and the two characteristic parameters α1, α2, the surface of the target 10 covering the sensor 100 and the distance separating the target 10 and the sensor 100 may be calculated in "real time" during the "detection part".

2—Detection Part

This detection part is divided in 4 main steps: 1) the calculation of an index pointer for "LookTRH", 2) the calculation of OCU1 and OCU2 origins, 3) the calculation of position m, and the calculation of the angle which give an information about surface occupation and 4) the calculation of distance between target 10 and sensor 100.

21—Step 1:Calculation of Index Pointer for "LookTRH"

Signals CU1, C1, CU2, C2 are acquired on sensor 100 in real time.

From the two relationships CU1=f(C1) and CU2=f(C2), the $\alpha_1$, $\alpha_2$, interception abscissa and then the corresponding index pointer (B1+B2)/2 are calculated. With this index (straight or by interpolation) the T/RH couple information are pulled out from Look Up Table "LookTRH".

22—Step 2: Calculation of OCU1 and OCU2 Origins.

With the previous T/RH couple information, the origins OCU1 and OCU2 for curve CU2=f(CU1) are pulled out from Look Up Tables "LookOCU1", "LookOCU2" (straight or by linear interpolation).

23—Step 3: Calculation of Position m, and Calculation of the Angle Which Give Surface Occupation The slope a=(CU2−OCU2)/(CU1−OCU1) is calculated and from this calculated slope a, as well as from the T/RH couple information obtained at step 1, a value representative of position is pulled out from Look Up Table "LookAngle". This value is representative of surface occupation by a target 10, such as a passenger, in front of sensor 100.

In other words for each capacitive sensor 100, the value pulled out from the Look Up Table "LookAngle" is representative of the surface Sdi of the target 10, such as an occupant, covering the sensor 100.

24—Step 4: Calculation of Distance Between Target and Sensor.

A value D=$\sqrt{(CU1n-OCU1(TRH))^2+(CU2n-OCU2(TRH))^2}$ is calculated.

Then on the basis of this value D, as well as from the T/RH couple information obtained at step 1 and the angle value obtained at step 3, an estimated distance is pulled out from Look Up Table "LookAbs" (straight or by linear interpolation).

In other words for each capacitive sensor 100, the value pulled out from the Look Up Table "LookAbs" is representative of the distance di separating the target 10 from the sensor 100.

In summarize from data acquisition CU1, C1, CU2, C2 the above described method allows to determine to calculate surface occupation Sdi by a target 10 placed in front of sensor 100 and its distance di from said sensor 100.

Figure 29:
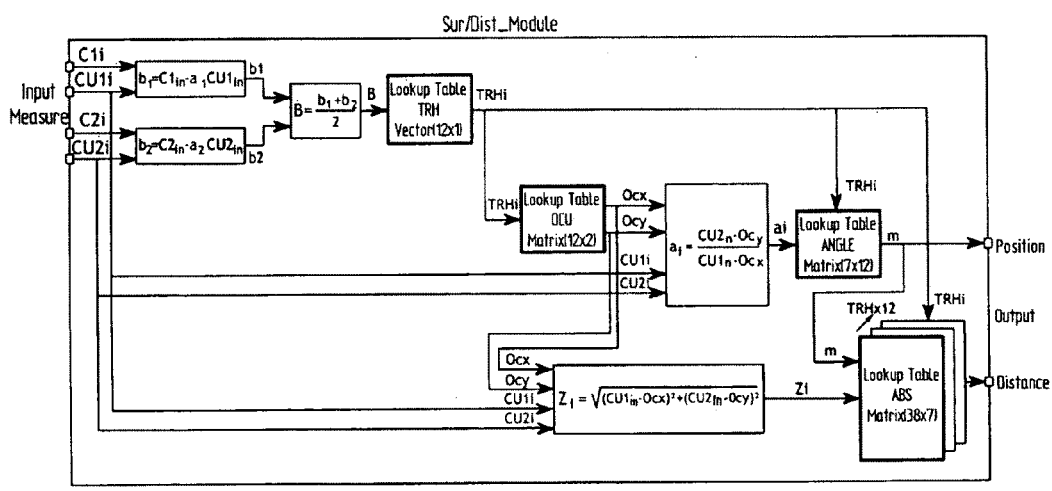
FIG. 29 illustrates schematically the complete detection method in accordance with the present invention.

This complete detection method is illustrated on FIG. 29.

Figure 33:
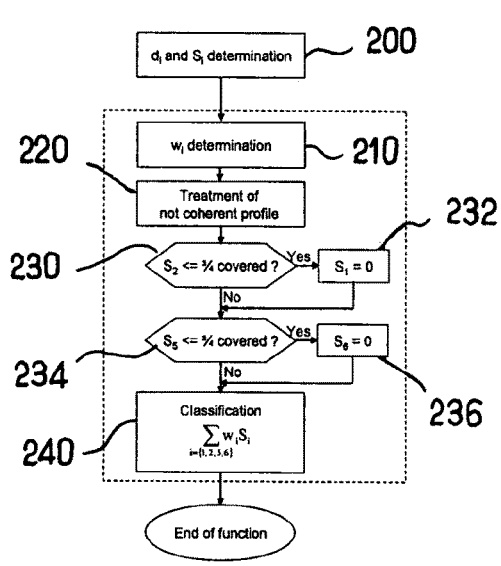
FIG. 33 illustrates schematically the main steps of the method in accordance with the present invention.

It corresponds also to the first step 200 of the method illustrated on FIG. 33.

Results got by the inventors by implementation of this method, for variation of surface in all temperature and humidity range, are displayed in FIG. 30. On this FIG. 30, Y axis corresponds to the estimated (calculated) surface Sdi while the X or abscissa axis corresponds to the real surface.

Distances di calculated up to one inch on the basis of these results are displayed in FIG. 31.

FIGS. 30 and 31 show that this method offers a reliable determination both of the distance di separating a target 10 from a sensor 100 and the surface Sdi of the target 10 covering the sensor 100.

Particularly this method allows, to compensate the drifts caused by temperature and humidity.

C. Determination of the Morphology of an Occupant in an Automotive Seat in Accordance with the Present Invention.

In order to get passenger discrimination it is necessary to place judiciously several sensors 100 in a seat. Industrial constraints and cost issue limit of course the number of sensors.

Figure 32:
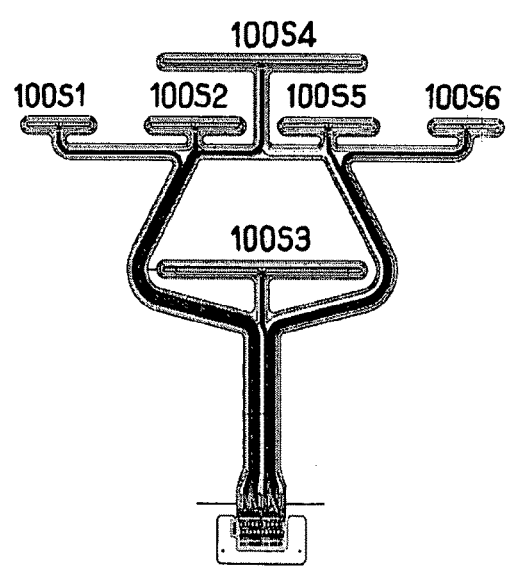
FIG. 32 illustrates schematically the corresponding array of sensors.

FIGS. 2 and 32 illustrate a preferential but non limitative implantation of such sensors 100 in a seat in accordance with the present invention.

The sensors 100 illustrated on FIGS. 2 and 32 are provided in the seating horizontal supporting part of a seat. Of course if necessary additional sensors 100 may be also provided in the back vertical part of the seat.

The specific and non limitative embodiment illustrated on FIGS. 2 and 32 comprises 6 sensors 100. Preferentially each sensor 100 comprises 3 electrodes 110, 120 and 130 as described above and consequently each sensor 100 defines two pixels from respective main electrodes 110, 120.

We distinguish on FIGS. 2 and 32:

four short pixel sensors (having typically a length about 9 cm) 100S1, 100S2, 100S5 and 100S6, and two long pixel sensors (having typically a length about 29 cm) 100S3 and 100S4.

Sensors 100S1 and 100S6 are provided on the external lateral parts of the seat, named bolster.

Sensors 100S2 and 100S5 are provided on the central part of the seat, in the vicinity of said bolster.

Preferentially all four sensor 100S1, 100S2, 100S3 and 100S4 are aligned from left to right on the seat, approximately in the middle of the depth of the seat, i.e. approximately at the same distance from the front and the back of the seat.

Sensor 100S3 and 100S4 are provided respectively on each side of the sensors 100S2 and 100S5, on the central part of the seat, sensor 100S3 being placed at onward of seat while sensor 100S4 is placed backward of seat.

For each of the 6 sensors (100S1 to 100S6) a surface occupation Sdi and an associated distance di is determined, as schematically illustrated by step 200 on FIG. 33.

When each sensor 100 comprises two pixels corresponding to main electrodes 110, 120, as it is the case with the specific embodiment illustrated on FIG. 1, using six sensors 100 leads to 12 individual information pixel.

Preferentially the method in accordance with the present invention comprises a filtering step to determine the values Sdi and di corresponding to an "empty" sensor, i.e. a sensor having no detected target in front of it.

Figure 34:
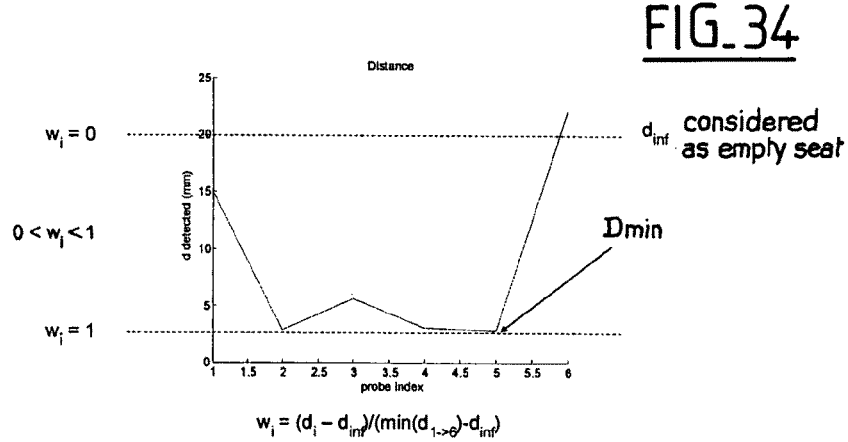
FIG. 34 illustrates schematically an example of evolution of the measured distance from one sensor to the other.

A distance threshold is used to decide if a sensor is empty or not. Such distance threshold is called $d_{inf}$ on FIG. 34.

If $di > d_{inf}$ then sensor 'i' is considered empty. If $di \leq d_{inf}$ sensor 'i' is considered occupied.

For example we can choose dinf=20 mm

Such filtering step may be either operated preceding the weighting step 210 illustrated on FIG. 33, so as to eliminate the values Sdi and di corresponding to an "empty" sensor, or may be operated to prepare a step referenced 220 on FIG. 33 corresponding to an analysis of coherence so as to reject all non coherent profile of morphology.

The characterization of all the sensors 100S1 to 100S6 is done arbitrary from left side to right side. Depending of the value Sdi determined for each "occupied" sensor 100, corresponding Si values are established, Si values being arbitrary comprised between 0.25 and 1.75, with step of 0.25. Si=0.25 corresponds to the case illustrated on the bottom of FIG. 22 (¼ of sensor covered from left). Si=1 corresponds to the case illustrated on the middle of FIG. 22, i.e. a target centred on the sensor. Si=1.75 corresponds to the case illustrated on the top of FIG. 22 (¼ of sensor covered from right).

For using this characterization in the seat it is necessary to re-direct sensor sense because sensor placement is symmetrical and of course variation between left side and right side are in opposite.

In other words for left side surface detected sense (sensor 100S1 and 100S2) the retained Si is moving from 0.25 to 1.75.

For right side (sensor 100S5 and 100S6), sense surface detected is in opposite sense. Consequently the retained Si is $=2-S_{detected}$.

A very simple way to classify the occupant, i.e. to determine the morphology of an occupant detected on a seat, would be to operate a straight calculation by counting up the number of pixel of the sensors 100S1 to 100S6 which are covered by a target.

However such a simple method is distorted and causes some errors.

Indeed surface projection on sensor 100 is always seen in the same way, whatever the distance di is. In other words with such a simple calculation method, the passenger's outline would not be taken into account and some time errors can occur.

To avoid this disturbance the inventors propose, in accordance with the present invention, to balance the calculated surface Si by a weighting parameter Wi based on the corresponding respective distance di.

To do this, the minimum distance di among sensors 100S1 to 100S6 (at least for the four sensors 100S1, 100S2, 100S5, 100S6) is detected. Then after for each sensor 100S1, 100S2, 100S5 and 100S6, a balanced coefficient called "Wi" is calculated.

Coefficient Wi may be calculated according to a plurality of functions.

Preferentially coefficients Wi=(di−dinf)/[min(d1 to dp)−dinf]

Wherein di=distance calculated for sensor i, dinf=infinite distance, that is to mean when seat is considered empty (for example 20 mm), min(d1 to dp)=minimum distance calculated for all p sensors 100S1, 100S2, 100S5, 100S6.

After calculation of coefficients Wi, each surface Si calculated for each sensor 100 is multiplied at step 210 by the corresponding Wi coefficient, and this for sensors 100S1, 100S2, 100S5, 100S6. Such weighting step 210 takes into account the passenger outline and get a passenger consistent pattern surface.

Figure 35:
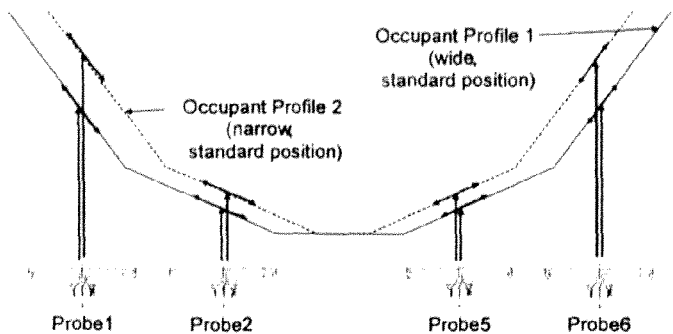
FIG. 35 illustrates schematically two variants of position of occupant on a seat of car.

For example such weighting step 210 allows to distinguish between two occupant profiles being in a standard centred position on a seat, as illustrated on FIG. 35, one being a narrow profile and the other being a wide profile. Without such a weighting prosecution 210, the values of Si obtained for the two occupant profiles would have similar issues when determining the morphology.

Wi values are illustrated on the left of FIG. 33. Wi is maximum with the minimal distance di. Note that if measured di>dinf, then we consider di=dinf.

After the weighting step 210, and before counting up all elementary surfaces Si at step 240, the inventors propose to operate a step 220 to eliminate non coherent profiles. Indeed the inventors have uncovered that some specific situations may lead to non coherent profiles.

A specific non coherent profile is for example the case of a child well seated in the middle of the seat but with hand on bolster. This of course could cause an error because the sensors 100 "see" the child's breadth bigger and could cause a misclassification (a child is seen like an adult).

Preferentially the step 220 comprises firstly a "centre detection" step. The aim of this centre detection step is to retain only the information corresponding to a sensor 100 which is considered as totally covered. Indeed in practice, this is rarely reached since many passengers have bad positioning.

Preferentially the centre detection step considers a sensor 100 is totally covered (centre position) if the surface Si is included between value defined as $1-\alpha = < Si = < 1+\alpha$, with for example $\alpha = 0.25$. Threshold may be modified if necessary.

Consequently the information issued from the sensor is not retained if $Si < 1-\alpha$ or if $Si > 1+\alpha$.

Secondly the coherence analysis step 220 comprises preferentially a step for distinguishing two adjacent sensors surface Si and Si+1 (greater or lesser) considering a second parameter $\beta$ in order to know the slope progression from one sensor to another. That means if the surface Si move like: $Si < S(i+1)+\beta$ or $Si > S(i+1)-\beta$ there is variation and the slope of variation is calculated and compared with a respective threshold for coherence analysis. For example $\beta = 0.125$.

Multiplying all surfaces Si by the balance coefficient Wi (Si*Wi) and managing surface tolerance as described above, allow to check the consistency of profile in order to detect anomaly and avoid misclassification.

After these treatments, for all elementary surface Si by Wi, $\alpha$, $\beta$, some atypical cases may be eliminated at step 220.

Figure 36:
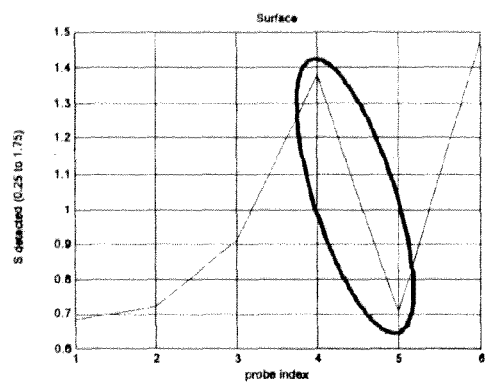
FIG. 36 illustrates on a curve, an example of partial rejected output due to incoherence.

For example FIG. 36 shows an atypical case of a child with hand on bolster leading to a down slope between sensor 100S4 and sensor 100S5.

Such a profile is not contiguous like the one of FIG. 35. This profile which is typically a small child seated in the central inset of the seat with his left hand lay down on bolster, must be eliminated at step 220.

Figure 37:
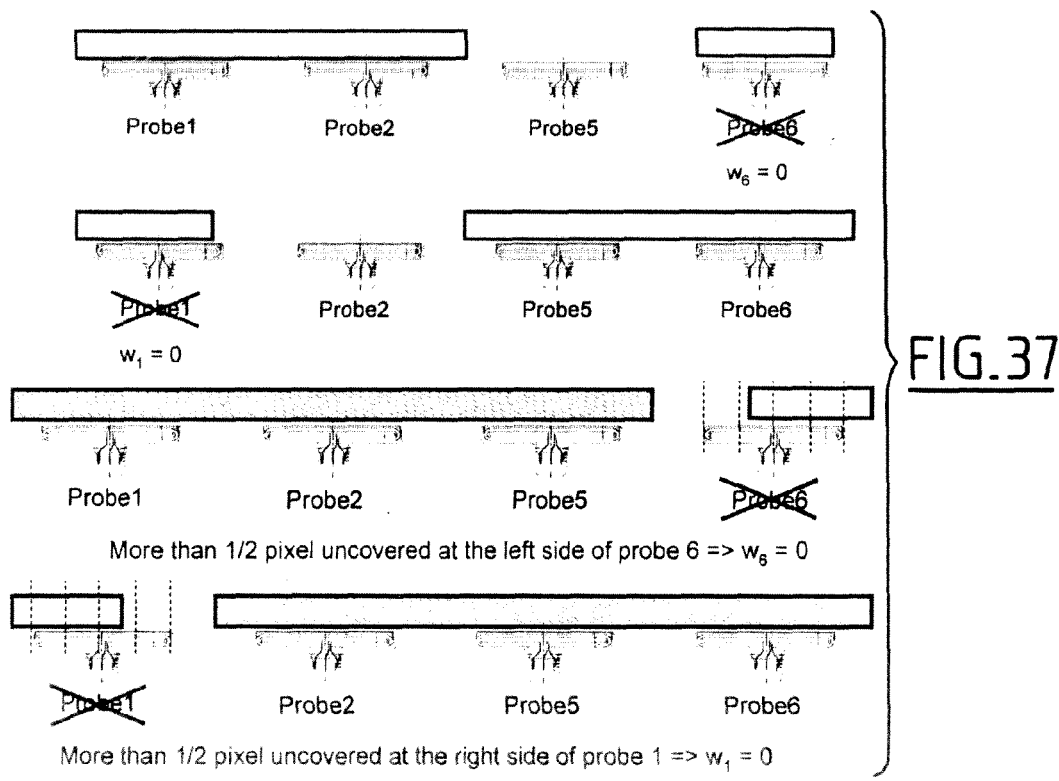
FIG. 37 illustrates four other examples of partial outputs rejected for incoherence.

Other typical non coherent cases are illustrated on FIG. 37. This FIG. 37 illustrates detection of a "hole" (that means a detected distance which is greater than dinf (for example but non limitatively a distance greater than 20 mm). In case of such detection of a hole, the next adjacent sensor or pixel is not retained for classification. For example if a hole is detected between sensor 100S2 and sensor 100S6, only sensors 100S1 and 100S2 are used for classification. Such operation is equivalent to force Si to 0 for sensor 100S6. So for opposite side if a hole is detected between sensor 100S1 and 100S5 only sensors 100S5 and 100S6 are used for classification. Such operation is equivalent to force Si to 0 for sensor 100S1.

The criteria $\alpha$ to determine if a sensor is covered or not and consequently if a hole exists or not, may change from a system to the other.

The two first lines of FIG. 37 illustrates a case wherein a hole corresponds to a sensor fully not covered.

The two last lines of FIG. 37 illustrates a case wherein a hole corresponds only to a ½ pixel, i.e. a ¼ sensor, not covered. This last case may be implemented by the step referenced 230, 232, 234 and 236 on FIG. 33, wherein if sensor 100S2 is measured as no more than ¾ covered, Si for sensor 100S1 is forced to 0, and if sensor 100S5 is measured as no more than ¾ covered, Si for sensor 100S6 is forced to 0.

Preferentially during analysis of no coherent profiles, the system considers the sign of the slope variation between 2 adjacent pixels for the central sensors 100S1, 100S2, 100S5 and 100S6. Examples of no coherent profile are given on FIGS. 38 and 39 which illustrate an anomalous sign changing of slope between two adjacent pixels.

After normalization of all elementary surfaces Si by Wi coefficients, all possible cases for "hole" detection and their treatment are considered, so for the detection of all abnormal slope variation between two adjacent sensors (with the treatment of $\alpha$ and $\beta$ parameters described previously).

An example of "truth table" for such treatment is illustrated on FIG. 40.

Thirty two cases are listed. "Left side" relates to left sensors 100S1 and 100S2. "Right side" relates to right sensors 100S6 and 100S5. On FIG. 40 the state of each sensor is identified as E=empty, L=left occupation, C=center (means sensor totally covered) and R=right occupation.

On FIG. 40:

first line corresponds to the case of two adjacent sensors 100S1 and 100S2 or 100S5 and 100S6 which are detected empty. This case is not taken into account.

second line corresponds to the case of an external sensor 100S1 or 100S6 empty, but only an adjacent part of the next sensor 100S2 and 100S5 being occupied. Such case is also considered as erroneous and is not taken into account.

third and fourth lines correspond to cases wherein external sensor 100S1 or 100S6 is empty, but the next sensor 100S2 and 100S5 is either fully occupied or occupied on its part opposite said external sensor. In this case the Si value obtained for sensor 100S2 and/or sensor 100S5 is retained.

$5^{th}$ line corresponds to cases wherein the external sensor 100S1 or 100S6 is covered only on its external part, but the adjacent sensor 100S2 or 100S5 is empty. This is a hole detection which is not retained.

$6^{th}$ line corresponds to cases wherein both the external sensor 100S1 or 100S6 and the adjacent sensor 100S2 or 100S5 are covered only on their external part. Such case is also considered as erroneous and is not taken into account.

$7^{th}$ line corresponds to cases wherein the external sensor 100S1 or 100S6 is covered only on its external part, while the adjacent sensor 100S2 or 100S5 is fully covered. In this case the Si value obtained for sensor 100S2 and/or sensor 100S5 is retained.

$8^{th}$ line corresponds to cases wherein the external sensor 100S1 or 100S6 is covered only on its external part, while the adjacent sensor 100S2 or 100S5 is covered on its opposite part. In this case the Si value obtained for sensor 100S2 and/or sensor 100S5 is retained.

$9^{th}$ line corresponds to cases wherein the external sensor 100S1 or 100S6 is fully covered, but the adjacent sensor 100S2 or 10S5 is empty. This is a hole detection which is not retained.

$10^{th}$ line corresponds to cases wherein the external sensor 100S1 or 100S6 is fully covered, but the adjacent sensor 100S2 or 100S5 is only covered on a part adjacent said external sensor. In this case a summation of the signal obtained from these couples of sensors (100S1 and 100S2 or 100S5 and 100S6) is operated only if the opposite internal sensor (i.e. respectively 100S5 and 100S2) is empty. Otherwise the signals are eliminated.

$11^{th}$ line corresponds to cases wherein both the sensors 100S1 and 100S2 or 100S5 and 100S6 are fully covered. In such case the signals are summed.

12th line corresponds to cases wherein the external sensor 100S1 or 100S6 is fully covered, but the adjacent sensor 100S2 or 100S5 is only covered on a part opposite this external sensor. In such a case, the signal issued from the internal sensor 100S2 and/or 100S5 is retained, but the signal issued from the external sensor 100S1 and/or 100S6 is retained only if S1<S2+β or S6>S5−β.

13th line corresponds to cases wherein the external sensor 100S1 or 100S6 is covered only on its internal part, and the adjacent sensor 100S2 or 100S5 is empty. This is a hole detection which is not retained.

14th line corresponds to cases wherein the external sensor 100S1 or 100S6 is covered only on its internal part, and the adjacent sensor 100S2 or 100S5 is only covered on a part adjacent said external sensor. In this case a summation of the signal obtained from these couples of sensors (100S1 and 100S2 or 100S5 and 100S6) is operated only if the opposite internal sensor (i.e. respectively 100S5 and 100S2) is empty. Otherwise the signals are eliminated.

15th line corresponds to cases wherein the external sensor 100S1 or 100S6 is covered only on its internal part, and the adjacent sensor 100S2 or 100S5 is fully covered. In such case the signals are summed.

16th line corresponds to cases wherein the external sensor 100S1 or 100S6, as well as the adjacent sensor 100S2 or 100S5 are covered only on their internal part. In such a case, the signal issued from the internal sensor 100S2 and/or 100S5 is retained, but the signal issued from the external sensor 100S1 and/or 100S6 is retained only if Si<S2+β or S6>S5−β.

In order to have an information about the quality of the discrimination, preferentially an associated "confidence test" is operated before step 240.

Confidence test is based preferentially on distance detection and may be calculated as follows:

Confidence rate for empty seat cases:

$c=1-(\text{number of occupied sensors/total number of sensors})$

Confidence rate when classification is impossible (small sensors 100S1, 100S2, 100S3 and 100S4 are all empty):

$c=0$

The confidence rate for others cases (occupied seat) is based on distance parameter:

$c=1-(\Delta d/dinf)$

In order to have a confidence, $0<c<1$:

if $\Delta d>dinf, \Delta d=dinf$

For backward position:

$\Delta d=|\min(d1,d2,d5,d6)-d4|$

For forward position:

$\Delta d=|\min(d1,d2,d5,d6)-d3|$

For left positioning:

$\Delta d=|\min(d1,d2)-d5|$ (or $d6$ depending on case)

For right positioning:

$\Delta d=|\min(d5,d6)-d2|$ (or $d1$ depending on case)

Of course as soon as an anomaly like no coherent profile, hole, no coherent slope, is detected, the confidence test is decreased.

After these different treatments, the classification of the passenger may be determined.

Preferentially this classification is operated by counting up the number of surface Si (number of pixel, or half pixel depending of the resolution wanted) of the central chain of sensors 100S1, 100S2, 100S5, 100S6.

In other words $$\text{Classification} = \sum_{i=1,2,5,6} Si*Wi$$

After regarding statistical distribution linked with hip width versus morphological class, different threshold are expressed as number of pixel for all classes.

Typically FMVSS 208 regulation is displayed on FIG. 41.

A Data Base corresponding to recordation of a passengers sample is illustrated on FIG. 42.

The results get with this Data Base are listed on FIG. 43.

Analysis of these results leads to demonstration that a threshold separates the Σ Si×Wi values for child from the Σ Si×Wi values for adult. Typically this threshold is about 1.35 as illustrated on FIG. 43.

A proposition of thresholds placement for class separation is done on FIG. 44. Such thresholds illustrated on FIG. 44 are of course only non limitative examples.

To summarize the method illustrated on FIG. 33 comprises the steps of:
Calculation 200 of di and Si for each individual sensor 100,
Calculation 210 of Wi for each individual sensor 100,
Treatment 220 of no coherent profile,
Classification 240 of passengers by calculating $$\sum_{i=1,2,5,6} Si*Wi$$

and the associated confidence test.

Of course the present invention is not limited to the above specification which is given only for illustration. The present invention includes any alternative in conformity with the enclosed claims.

Figure 45:
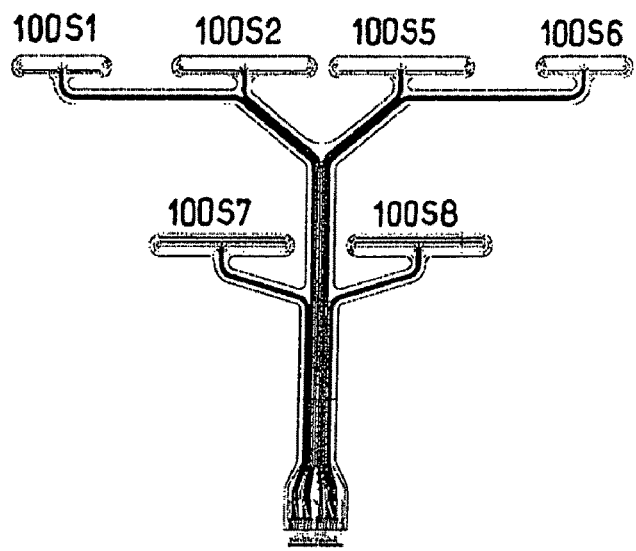
FIG. 45 illustrates a second variant of implantation of capacitive sensors in accordance with the present invention.
Figure 46:
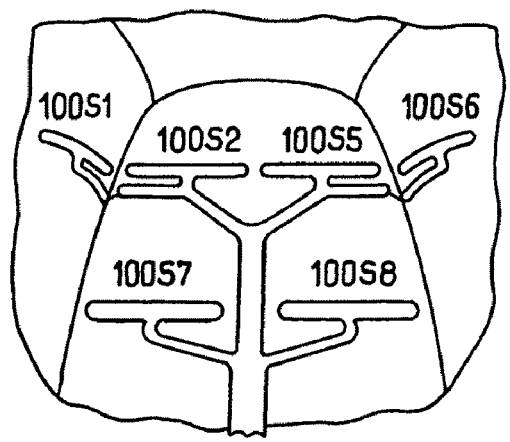
FIG. 46 illustrates the same variant of sensors provided on a seat.

FIGS. 45 and 46 illustrate a variant of implantation for the sensors. More precisely, FIGS. 45 and 46 illustrate a line of four sensors 100S1, 100S2, 100S5 and 100S6 similar to the corresponding sensors of FIGS. 2 and 32, provided on the inset of the seat, near the back, and two additional short sensors 100S7 and 100S8 provided on the same inset of the seat, near the front part of the seat and respectively near the bolsters.

Figure 47:
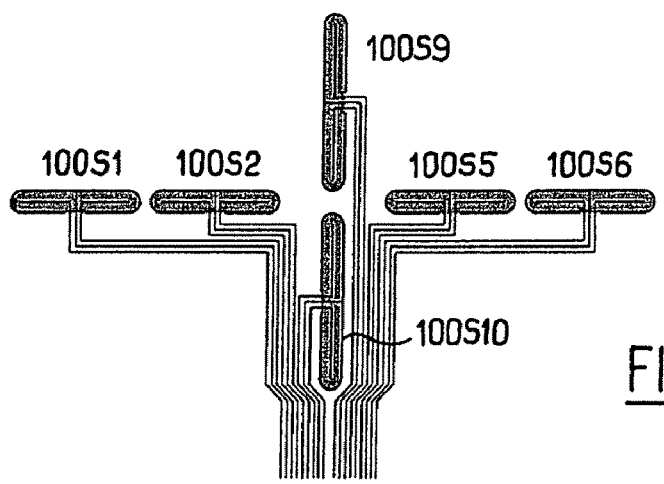
FIG. 47 illustrates another variant of implantation of capacitive sensors in accordance with the present invention.

FIG. 47 illustrates another variant of implantation for the sensors, wherein the sensors 100S3 and 100S4 of FIGS. 2 and 32 which are parallel to sensors 100S1, 100S2, 100S5 and 100S6, are replaced by sensors 100S9 and 100S10 transverse to sensors 100S1, 100S2, 100S5 and 100S6.

What is claimed is:

1. A method for discriminating the morphology of a passenger seating in an automotive seat, comprising the steps of
   i) providing a set of a plurality of capacitive sensors covering substantially a transversal cross section of a seat,
   ii) collecting the outputs of said plurality of capacitive sensors provided on the seat,
   iii) determining the morphology of a target facing the seat on the basis of measured distance separating the target from the sensors and measured surface of the sensors covered by the target, from said outputs, by selecting a value representative of the distance (di) separating the target from the sensor, from a look up table, using as input for this selection a combination of the outputs issued by the capacitive sensor and selecting a value representative of the amount (Sdi) of the surface of the sensor covered by said target, from another look up table, using also as input for this selection a combination of the outputs issued by the capacitive sensor, and iv) comparing the determined morphology with at least a reference morphology so as to classify the determined morphology between a plurality of reference morphologies, wherein the comparing step involves a mathematical function of Gaussian type.

2. A method for discriminating the morphology of a passenger seating in an automotive seat, comprising the steps of i) providing a set of a plurality of capacitive sensors covering substantially a transversal cross section of a seat, ii) collecting the outputs of said plurality of capacitive sensors provided on the seat, iii) determining the morphology of a target facing the seat on the basis of measured distance separating the target from the sensors and measured surface of the sensors covered by the target, from said outputs, by selecting a value representative of the distance (di) separating the target from the sensor, from a look up table, using as input for this selection a combination of the outputs issued by the capacitive sensor and selecting a value representative of the amount (Sdi) of the surface of the sensor covered by said target, from another look up table, using also as input for this selection a combination of the outputs issued by the capacitive sensor, and iv) comparing the determined morphology with at least a reference morphology so as to classify the determined morphology between a plurality of reference morphologies, wherein the comparing step involves a Bell like function S(p) of order n:

$$S(p) = \frac{ba}{a + (p-m)^n} \quad (1)$$

wherein:

a depends on the inflexion of the bell, b is the maximal value of S, and m is the index value p for which S(p) is maximal.

3. A method for discriminating the morphology of a passenger seating in an automotive seat, comprising the steps of i) providing a set of a plurality of capacitive sensors covering substantially a transversal cross section of a seat, ii) collecting the outputs of said plurality of capacitive sensors provided on the seat, iii) determining the morphology of a target facing the seat on the basis of measured distance separating the target from the sensors and measured surface of the sensors covered by the target, from said outputs, by selecting a value representative of the distance (di) separating the target from the sensor, from a look up table, using as input for this selection a combination of the outputs issued by the capacitive sensor and selecting a value representative of the amount (Sdi) of the surface of the sensor covered by said target, from another look up table, using also as input for this selection a combination of the outputs issued by the capacitive sensor, and iv) comparing the determined morphology with at least a reference morphology so as to classify the determined morphology between a plurality of reference morphologies, wherein the comparing step involves a 3D reference image representing a morphology reference.

4. A method for discriminating the morphology of a passenger seating in an automotive seat, comprising the steps of i) providing a set of a plurality of capacitive sensors covering substantially a transversal cross section of a seat, ii) collecting the outputs of said plurality of capacitive sensors provided on the seat, iii) determining the morphology of a target facing the seat on the basis of measured distance separating the target from the sensors and measured surface of the sensors covered by the target, from said outputs, by selecting a value representative of the distance (di) separating the target from the sensor, from a look up table, using as input for this selection a combination of the outputs issued by the capacitive sensor and selecting a value representative of the amount (Sdi) of the surface of the sensor covered by said target, from another look up table, using also as input for this selection a combination of the outputs issued by the capacitive sensor, and iv) comparing the determined morphology with at least a reference morphology so as to classify the determined morphology between a plurality of reference morphologies, wherein the comparing step comprises calculating a distance between a profile measurement and a reference plane.

5. The method of one of claims 1 or 2-4, characterized in that it comprises a step of rejecting all measurements that are not coherent with a passenger outline.

6. The method of one of claims 1 or 2-4, characterized in that the comparing step involves a mathematical function S(p) representing a morphology reference.

7. The method of one of claims 1 or 2-4, characterized in that the comparing step comprises applying both 1) an evaluation of profile measurements in regard of a template and 2) an evaluation in regard of a reference plane, and then selecting the evaluation which leads to the minimum error criteria.

8. The method of one of claims 1 or 2-4, characterized in that the method implements a capacitive sensor comprising at least two electrodes covering complementary respective areas of a sensed zone so as to form two balanced pixel sensors.

9. The method of one of claim 1 or 2-4, characterized in that the method implements a capacitive sensor comprising three electrodes:

two main electrodes covering complementary respective areas of a sensed zone and a third auxiliary electrode covering both said complementary respective areas.

10. The method of one of claim 1 or 2-4, characterized in that the method implements a capacitive sensor wherein said third auxiliary electrode surrounds the two main electrodes.

11. The method of one of claim 1 or 2-4, characterized in that comprises the steps of collecting the outputs of a plurality of capacitive sensors provided on a seat, determining for each capacitive sensors a first value representative of the distance (di) separating a target from the sensor and a second value (Sdi) representative of the surface of the sensor covered by the target, applying to the second values (Sdi) representative of the surface of the sensor covered by the target a respective weighting (Wi) based on the corresponding first value (di) representative of the distance separating the target from the sensor covered by the target, and determining the morphology of the target on the basis of the collection of weighted second values (Sdi×Wi).

12. The method of one of claims 1 or 2-4, characterized in that the method implements at least four sensors substantially aligned from left to right on a seat.

13. The method of one of claims 1 or 2-4, characterized in that the method implements look up tables which contain values representative of the distance (di) separating the target from the sensor or values representative of the amount (Sdi) of the surface of the sensor covered by said target, for a plurality of temperature and humidity values, and the method comprises the step of selecting in the look up tables an output value depending on a combination of the outputs issued by the capacitive sensor which represents real temperature and humidity.

14. Seat for an automotive car characterized in that it comprises means for implementing the method in accordance with one of claims 1 or 2-4.

15. The method of claim 2, characterized in that the comparing step comprises determining if a profile measurement corresponds to the shape of a mathematical function.

16. The method of claim 2, characterized in that determining if a profile measurement corresponds to the shape of a mathematical function comprises calculating an error criteria.

17. The method of claim 2, characterized in that it comprises calculation for each profile measurement of the parameter "a" by:

determining the surface S under the profile measurement:

$$S = \sum_i iP_i$$

determining the surface $S_b$ under the Bell like function:

$$S_b = \int_1^8 \text{Bell}(p)dp = b\sqrt{a}\left(\arctan\left(\frac{m-1}{\sqrt{a}}\right) - \arctan\left(\frac{m-8}{\sqrt{a}}\right)\right),$$

and equalizing the two surfaces $S=S_b$, to obtain "a".

18. The method of claim 17, characterized in that the equalizing step is performed by using a lookup table for $S_b$.

19. The method of claim 3, characterized in that the comparing step involves construction of a n by m mesh, by interpolation of the profile measurements, to create a profile, wherein in said n by m mesh comprises a plurality of pixels, each pixel having a pixel value.

20. The method of claim 19, characterized in that the construction of the n by m mesh is operated on the basis of the following rules:
for the pixels of the mesh where there is no probe, the pixel value is interpolated from the nearest probes,
for the areas of the mesh where there is more that one pixel to interpolate between two measured pixels, the intermediate pixels values are linearly interpolated between the measured pixels over the distance separating them.

21. The method of claim 19, characterized in that the construction of the n by m mesh comprises generating some pixels of the mesh by interpolation between a measured pixel and a previously interpolated pixel.

22. The method of claim 3, characterized in that the comparing step comprises comparing a profile measurement with a maximal template limit and with a minimal template limit.

23. The method of claim 3, characterized in that the comparing step comprises counting the number of pixels of a profile measurement that belongs to the template.

24. The method of claim 4, characterized in that the distance to the reference plane in calculated as follows:

$$D = \sum_i (P_{RP}(i) - P_1(i))^2,$$

wherein, $P_{RP}(i)$ are pixels of the reference plane, $P_1(i)$ are pixels of the measured image, and D is the distance of the image to the reference plane.

25. The method of claim 4, characterized in that the distance to the reference plane in calculated using a normalized version for the distance:

$$D = \frac{\sum_i (P_{RP}(i) - P_1(i))^2}{\sum_i P_{RP}(i)^2}.$$

* * * * *

UNITED STATES PATENT AND TRADEMARK OFFICE
CERTIFICATE OF CORRECTION

| | |
|---|---|
| PATENT NO. | : 7,962,311 B2 |
| APPLICATION NO. | : 11/820963 |
| DATED | : June 14, 2011 |
| INVENTOR(S) | : Claude Launay et al. |

Page 1 of 1

It is certified that error appears in the above-identified patent and that said Letters Patent is hereby corrected as shown below:

Column 24, Claim 9, line 1, delete "claim", insert -- claims --.
Column 24, Claim 10, line 1, delete "claim", insert -- claims --.
Column 24, Claim 11, line 1, delete "claim", insert -- claims --.
Column 24, Claim 11, line 2, after "that", insert -- it --.

Signed and Sealed this
Sixth Day of March, 2012

David J. Kappos
*Director of the United States Patent and Trademark Office*